(12) United States Patent
Gruber

(10) Patent No.: US 10,796,478 B2
(45) Date of Patent: Oct. 6, 2020

(54) DYNAMIC RENDERING FOR FOVEATED RENDERING

(71) Applicant: QUALCOMM Incorporated, San Diego, CA (US)

(72) Inventor: Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/143,260

(22) Filed: Sep. 26, 2018

(65) Prior Publication Data

US 2020/0098165 A1 Mar. 26, 2020

(51) Int. Cl.
*G06T 17/00* (2006.01)
*G06T 15/40* (2011.01)
*G06T 15/04* (2011.01)
*G06T 1/20* (2006.01)

(52) U.S. Cl.
CPC .............. *G06T 15/40* (2013.01); *G06T 1/20* (2013.01); *G06T 15/04* (2013.01)

(58) Field of Classification Search
CPC ......... G06T 17/20; G06T 19/00; G06T 17/00; G06T 17/005; G06G 17/10
USPC ........................................................ 345/420
See application file for complete search history.

(56) References Cited

U.S. PATENT DOCUMENTS

| | | | |
|---|---|---|---|
| 8,698,820 B2 | 4/2014 | Cox et al. | |
| 9,741,154 B2 | 8/2017 | Piazza et al. | |
| 9,792,722 B2 | 10/2017 | Liao et al. | |
| 9,852,539 B2 | 12/2017 | Nguyen | |
| 2010/0007662 A1* | 1/2010 | Cox | G06T 15/40 345/420 |
| 2018/0082469 A1* | 3/2018 | Andersson | G06T 1/20 |
| 2018/0182066 A1 | 6/2018 | Saleh et al. | |

* cited by examiner

*Primary Examiner* — Gordon G Liu
(74) *Attorney, Agent, or Firm* — Campbell C. Chiang; Arent Fox LLP

(57) ABSTRACT

A method, a computer-readable medium, and an apparatus are provided. The apparatus may be a GPU. The GPU generates first visibility information during a visibility pass associated with an application requested depth pre-pass. In addition, the GPU renders an application requested color pass based on the first visibility information generated during the visibility pass associated with the application requested depth pre-pass.

24 Claims, 12 Drawing Sheets

DYNAMIC RENDERING FOR FOVEATED RENDERING

FIELD

The present disclosure relates generally to graphics processing.

BACKGROUND

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes a plurality of processing stages that operate together to execute graphics processing commands/instructions and output a frame. A central processing unit (CPU) may control the operation of the GPU by issuing one or more graphics processing commands/instructions to the GPU. Modern day CPUs are typically capable of concurrently executing multiple applications, each of which may need to utilize the GPU during execution. A device that provides content for visual presentation on a display generally includes a GPU.

A GPU renders a frame of graphical content into a framebuffer for display. This rendered frame may be read from the framebuffer and processed by a display processing unit prior to being displayed. For example, the display processing unit may be configured to perform processing on one or more frames that were rendered for display by the GPU and subsequently output the processed frame to a display. The pipeline that includes the CPU, GPU, and display processing unit may be referred to as a display processing pipeline.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to generate first visibility information during a visibility pass of an application requested depth pre-pass. The apparatus may be configured to render an application requested color pass based on the first visibility information generated during the visibility pass of the application requested depth pre-pass.

In an aspect of the disclosure, a method, a computer-readable medium, and an apparatus are provided. The apparatus may be configured to generate first visibility information during a visibility pass of an application requested depth pre-pass. The apparatus may be configured to generate second visibility information during a render pass of the application requested depth pre-pass. The apparatus may be configured to render an application requested color pass based on the second visibility information generated during the render pass of the application requested depth pre-pass.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
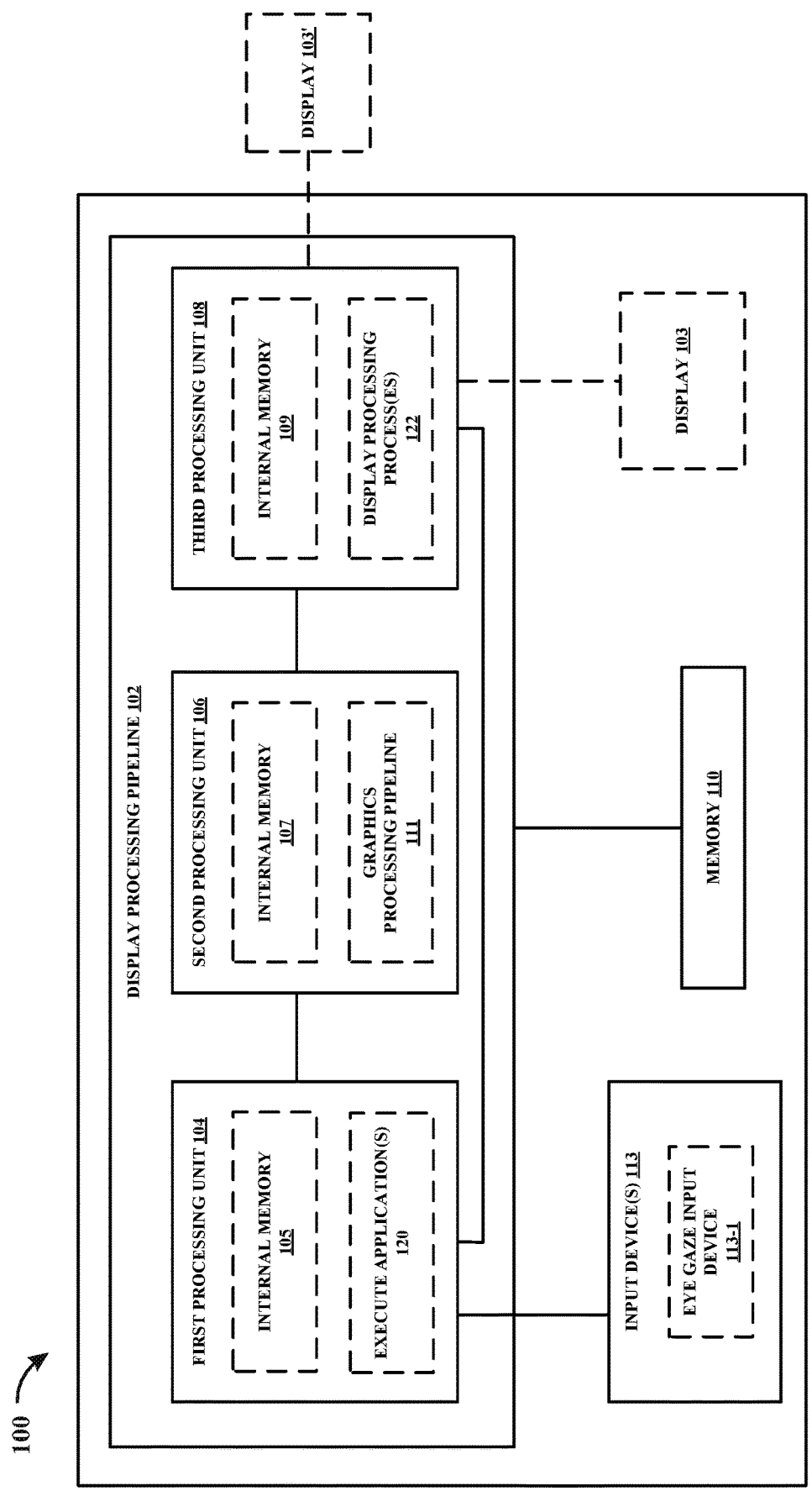
FIG. 1A is a block diagram that illustrates an example content generation and coding system in accordance with the techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, GPUs, general purpose GPUs (GPGPUs), CPUs, application processors, digital signal processors (DSPs), reduced instruction set computing (RISC) processors, systems on a chip (SoC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (i.e., software) being configured to perform one or more functions. In such examples, it is understood that the application may be stored on a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and executed the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (i.e., the frame includes two or more layers, and the frame that includes two or more layers may subsequently be blended).

As referenced herein, a first component (e.g., a GPU) may provide content, such as a frame, to a second component (e.g., a display processing unit). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

FIG. 1A is a block diagram that illustrates an example device 100 configured to perform one or more techniques of this disclosure. The device 100 includes display processing pipeline 102 configured to perform one or more technique of this disclosure. In accordance with the techniques described herein, the display processing pipeline 102 may be configured to generate content destined for display. The display processing pipeline 102 may be communicatively coupled to a display 103. In the example of FIG. 1A, the display 103 is a display of the device 100. However, in other examples, the display 103 may be a display external to the device 100 (as shown in FIG. 1 with display 103'). Reference to display 103 may refer to display 103 or display 103' (i.e., a display of the device or a display external to the device).

In examples where the display 103 is not external to the device 100, the a component of the device may be configured to transmit or otherwise provide commands and/or content to the display 103 for presentment thereon. In examples where the display 103 is external to the device 100, the device 100 may be configured to transmit or otherwise provide commands and/or content to the display 103 for presentment thereon. As used herein, "commands," "instructions," and "code" may be used interchangeably. In some examples, the display 103 of the device 100 may represent a display projector configured to project content, such as onto a viewing medium (e.g., a screen, a wall, or any other viewing medium). In some examples, the display 103 may include one or more of: a liquid crystal display (LCD), a plasma display, an organic light emitting diode (OLED) display, a projection display device, an augmented reality (AR) display device, a virtual reality (VR) display device, a head-mounted display, a wearable display, or any other type of display.

The display processing pipeline 102 may include one or more components (or circuits) configured to perform one or more techniques of this disclosure. As used herein, reference to the display processing pipeline being configured to perform any function, technique, or the like refers to one or more components of the display processing pipeline being configured to form such function, technique, or the like.

In the example of FIG. 1A, the display processing pipeline 102 includes a first processing unit 104, a second processing unit 106, and a third processing unit 108. In some examples, the first processing unit 104 may be configured to execute one or more applications 120, the second processing unit 106 may be configured to perform graphics processing, and the third processing unit 108 may be configured to perform display processing. In such examples, the first processing unit 104 may be a CPU, the second processing unit 106 may be a GPU, or a GPGPU, and the third processing unit 108 may be a display processing unit, which may also be referred to as a display processor. In other examples, the first processing unit 104, the second processing unit 106, and the third processing unit 108 may each be any processing unit configured to perform one or more feature described with respect to each processing unit.

The first processing unit may include an internal memory 105. The second processing unit 106 may include an internal memory 107. In some examples, the internal memory 107 may be referred to as a GMEM. The third processing unit 108 may include an internal memory 109. One or more of the processing units 104, 106, and 108 of the display processing pipeline 102 may be communicatively coupled to a memory 110. The memory 110 may be external to the one or more of the processing units 104, 106, and 108 of the display processing pipeline 102. For example, the memory 110 may be a system memory. The system memory may be a system memory of the device 100 that is accessible by one or more components of the device 100. For example, the first processing unit 104 may be configured to read from and/or write to the memory 110. The second processing unit 106 may be configured to read from and/or write to the memory 110. The third processing unit 108 may be configured to read from and/or write to the memory 110. The first processing unit 104, the second processing unit 106, and the third processing unit 108 may be communicatively coupled to the memory 110 over a bus. In some examples, the one or more components of the display processing pipeline 102 may be communicatively coupled to each other over the bus or a different connection. In other examples, the system memory may be a memory external to the device 100.

The internal memory 105, the internal memory 107, the internal memory 109, and/or the memory 110 may include one or more volatile or non-volatile memories or storage devices. In some examples, the internal memory 105, the internal memory 107, the internal memory 109, and/or the memory 110 may include RAM, static RAM (SRAM), dynamic RAM (DRAM), erasable programmable ROM (EPROM), EEPROM, Flash memory, a magnetic data media or an optical storage media, or any other type of memory.

The internal memory 105, the internal memory 107, the internal memory 109, and/or the memory 110 may be a non-transitory storage medium according to some examples. The term "non-transitory" may indicate that the storage medium is not embodied in a carrier wave or a propagated signal. However, the term "non-transitory" should not be interpreted to mean that the internal memory 105, the internal memory 107, the internal memory 109, and/or the memory 110 is non-movable or that its contents are static. As one example, the memory 110 may be removed from the device 100 and moved to another device. As another example, the memory 110 may not be removable from the device 100.

In some examples, the first processing unit 104 may be configured to perform any technique described herein with respect to the second processing unit 106. In such examples, the display processing pipeline 102 may only include the first processing unit 104 and the third processing unit 108. Alternatively, the display processing pipeline 102 may still include the second processing unit 106, but one or more of the techniques described herein with respect to the second processing unit 106 may instead be performed by the first processing unit 104.

In some examples, the first processing unit 104 may be configured to perform any technique described herein with respect to the third processing unit 108. In such examples, the display processing pipeline 102 may only include the first processing unit 104 and the second processing unit 106. Alternatively, the display processing pipeline 102 may still include the third processing unit 108, but one or more of the techniques described herein with respect to the third processing unit 108 may instead be performed by the first processing unit 104.

In some examples, the second processing unit 106 may be configured to perform any technique described herein with respect to the third processing unit 108. In such examples, the display processing pipeline 102 may only include the first processing unit 104 and the second processing unit 106. Alternatively, the display processing pipeline 102 may still include the third processing unit 108, but one or more of the techniques described herein with respect to the third processing unit 108 may instead be performed by the second processing unit 106.

The first processing unit 104 may be configured to execute one or more applications 120. The first processing unit 104 may be configured to provide one or more commands/instructions (e.g., draw instructions) to the second processing unit 106 to cause the second processing unit 106 to generate graphical content. As used herein, "commands," "instructions," and "code" may be used interchangeably. For example, execution of an application of the one or more applications 120 may cause one or more commands/instructions (e.g., draw instructions) corresponding to the application to be provided to the second processing unit 106 to generate graphical content for the application. In some examples, an application may be software (e.g., code) stored in the internal memory 105. In other examples, an application may be software stored in the memory 110 or another memory accessible to the first processing unit 104. In other examples, an application may be software stored in a plurality of memories, such as the internal memory 105 and the memory 110.

The second processing unit 106 may be configured to perform graphics processing in accordance with the techniques described herein, such as in a graphics processing pipeline 111. Otherwise described, the second processing unit 106 may be configured to perform any process described herein with respect to the second processing unit 106. For example, the second processing unit 106 may be configured to generate graphical content using tile-based rendering (also referring to as "binning"), direct rendering, adaptive rendering, foveated rendering, spatial anti-alias rendering, and/or any graphics processing technique.

In tile-based rendering, the second processing unit 106 may be configured to divide a buffer (e.g., a framebuffer) into a plurality of sub-regions referred to as bins or tile. For example, if the internal memory 107 is able to store N memory units of data (where N is a positive integer), then a scene may be divided into bins such that the pixel data contained in each bin is less than or equal to N memory units. In this way, the second processing unit 106 may render the scene by dividing the scene into bins that can be individually rendered into the internal memory 107, store each rendered bin from internal memory 107 to a framebuffer (which may be located in the memory 110), and repeat the rendering and storing for each bin of the scene. It is understood that a rendered frame is the combination of all the rendered bins. Rendering a bin into the internal memory 107 may include executing commands to render the primitives in the associated bin into the internal memory 107. The buffer that stores the rendered frame (i.e., all rendered bins corresponding to the frame) is referred to as the framebuffer. The framebuffer is allocated memory that holds one or more rendered frames that can be read by one or more other components, such as the third processing unit 108. Therefore, reference to dividing a framebuffer into a plurality of sub-regions refers to configuring the second processing unit 106 to render graphical content corresponding to a frame on a bin-by-bin basis.

As used herein, a "surface" may be interchangeable with "frame," "sub-frame," layer, or the like. For example, as described herein, the second processing unit 106 may be configured to render one or more surfaces of a frame. The second processing unit 106 may be configured to store each rendered surface for the frame into a respective intermediate buffer. The second processing unit 106 may be configured to combine (e.g., blend) the one or more rendered surfaces together to generate the frame. The second processing unit 106 may be configured to store the frame in the framebuffer. In this way, each surface may also be referred to as a frame or sub-frame. For example, the second processing unit 106 may be configured to generate one or more frames for generation of a final frame. The second processing unit 106 may be configured to store each rendered frame for the final frame into a respective intermediate buffer. The second processing unit 106 may be configured to combine (e.g., blend) the one or more rendered frames together to generate the final frame. The second processing unit 106 may be configured to store the final rendered frame in the framebuffer. As another example, the second processing unit 106 may be configured to generate one or more layers for generation of a final frame. The second processing unit 106 may be configured to store each rendered layer for the final frame into a respective intermediate buffer. The second processing unit 106 may be configured to combine (e.g., blend) the one or more rendered layers together to generate the final frame. The second processing unit 106 may be configured to store the final rendered frame in the framebuffer.

As described herein, the bins defined during the binning pass may be synonyms for bins/tiles of a rendered surface (which may be referred to as the rendered scene). For example, each bin may represent a portion of the rendered surface. The bins making up a scene can each be associated with a bin in memory that stores the graphical content included in each respective bin. A bin may be a portion of a memory that stores a portion of a rendered surface.

Tile-based rendering generally includes two passes: a binning pass and a rendering pass. During the binning pass, the second processing unit 106 may be configured to receive and process draw commands for a particular scene in preparation for rendering the scene into a frame. A draw command may include one or more primitives. A primitive may have one or more vertices. The second processing unit 106 may be configured to generate position data (e.g., coordinate data, such as three-axis (X, Y, Z) coordinate data) in screen space for each vertex of each primitive in the draw commands for a particular scene. During the binning pass, the second processing unit 106 may be configured to divide a buffer into which a frame is to be rendered into a plurality bins. In some examples, the second processing unit 106 may be configured to generate visibility information for each bin of the plurality of bins during the binning pass. In this regard, it is understood that the second processing unit 106 may be configured to generate visibility information on a per bin basis (e.g., visibility information is generated for each bin).

After generating visibility information for each bin (e.g., during the binning pass), the second processing unit 106 may be configured to separately render each respective bin of the plurality of bins using the respective visibility information for each respective bin. In some examples, the second processing unit 106 may be configured to use the visibility stream generated during the binning pass to refrain from rendering primitives identified as invisible during the binning pass, which avoids overdraw. Accordingly, only the visible primitives and/or the possibly visible primitives are rendered into each bin.

During the rendering of each bin, the second processing unit 106 may be configured to store the pixel values corresponding to the bin being rendered in the internal memory 107. In this way, tile-based rendering uses the internal memory 107 of the second processing unit 106. The second processing unit 106 may be configured to store (e.g., copy) a rendered bin stored in the internal memory 107 to a memory external to the second processing unit 106, such as memory 110. In some examples, once a bin is fully rendered into the internal memory 107, the second processing unit 106 may be configured to store the fully rendered bin to a memory external to the second processing unit 106. In other examples, the second processing unit 106 may be configured to render graphical content for a bin into the internal memory 107 and store graphical content rendered into the internal memory 107 into a memory external to the second processing unit 106 in parallel.

As used herein, "visibility information" may, in some examples, refer to any information in any data structure that indicates whether one or more primitives is visible and/or may be visible (e.g., possibly visible) with respect to the bin for which the visibility information was generated. Whether a primitive is visible/possibly visible or not visible may, as described herein, respectively refer to whether the primitive will be rendered or not rendered with respect to the bin for which the visibility information was generated. As used herein, a primitive that "may be visible" (e.g., a possibly visible primitive) may refer to the fact that it is unknown whether the primitive will be visible or will not be visible in the rendered frame (i.e., in the respective rendered bin of the rendered frame) at a particular processing point in the graphics processing pipeline (e.g., during the binning pass before the rendering pass) according to one examples. In another example, a primitive that "may be visible" (e.g., a possibly visible primitive) may refer to a primitive that is not or will not be definitively visible in the rendered frame (i.e., in the respective rendered bin of the rendered frame) at a particular processing point in the graphics processing pipeline (e.g., during the binning pass before the rendering pass).

For example, "visibility information" may refer to any information in any data structure that indicates whether one or more primitives associated with one or more draw commands is visible and/or may be visible with respect to the bin. As another example, "visibility information" may be described as a visibility stream that includes a sequence of 1's and 0's with each "1" or "0" being associated with a particular primitive located within the bin. In some examples, each "1" may indicate that the primitive respectively associated therewith is or may be visible in the rendered frame (i.e., in the respective rendered bin of the rendered frame), and each "0" may indicate that the primitive respectively associated therewith will not be visible in the rendered frame (i.e., in the respective rendered bin of the rendered frame). In other examples, each "0" may indicate that the primitive respectively associated therewith is or may be visible in the rendered frame (i.e., in respective the rendered bin of the rendered frame), and each "1" may indicate that the primitive respectively associated therewith will not be visible in the rendered frame (i.e., in the respective rendered bin of the rendered frame). As used herein, "visibility information" may be interchangeable with "visibility stream". In other examples, "visibility information" may refer to a data structure comprising visibility information in a format different from a visibility stream.

In direct rendering, the second processing unit 106 may be configured to render directly to the framebuffer (e.g., a memory location in memory 110) in one pass. Otherwise described, the second processing unit 106 may be configured to render graphical content to the framebuffer without using the internal memory 107 for intermediate storage of rendered graphical content. In some examples, direct rendering mode may be considered as a single bin in accordance with how tile-based rendering is performed, except that the entire framebuffer is treated as a single bin. As referred to herein, a rendering mode (e.g., a direct rendering mode, a tile-based rendering mode, an adaptive rendering mode, a foveated rendering mode, and a spatial anti-alias rendering mode) may refer to the second processing unit 106 being configured to perform one or more techniques associated with the rendering mode.

In adaptive rendering, the second processing unit 106 may be configured to combine one or more techniques of tile-based rendering and one or more techniques of direct rendering. For example, in adaptive rendering, one or more bins may be rendered to the internal memory 107 and subsequently stored from the internal memory 107 to the framebuffer in a memory external to the second processing unit 106 (e.g., the bins that are rendered using tile-based rendering mode), and one or more bins may be rendered directly to the framebuffer in the memory external to the second processing unit 106 (e.g., the bins that are rendered using direct rendering mode). The second processing unit 106 may be configured to render bins that are to be rendered using direct rendering using the visibility information generated during the binning pass for these respective bins and the rendering of these direct rendered bins may occur in one rendering pass. Conversely, the second processing unit 106 may be configured to render bins that are to be rendered using tile-based rendering using the visibility information generated during the binning pass for these respective bins and the rendering of these tile-based rendered bins may occur in multiple rendering passes (e.g., a respective rendering pass for each respective bin of the bins that are rendered using tile-based rendering).

In foveated rendering, the second processing unit 106 may be configured to render graphical content of a frame based on information indicative of an eye gaze region. The human vision system results in high resolution vision in the fovea (the central vision area, which is where a person is looking) and low resolution in the peripheral region around the fovea. Foveated rendering leverages how the human vision system works by rendering graphical content corresponding to an eye gaze region at a high resolution, and rendering graphical content corresponding the peripheral region around the eye gaze region at a low resolution. By reducing the resolution in the peripheral region, the computational load of the second processing unit 106 may be reduced, thus resulting in more efficient processing.

In spatial anti-alias rendering, rendering for a particular pixel may be upsampled and the subsequently rendered upsampled graphical content may be downsampled to generate a rendered frame with improved quality relative to the quality of the frame had spatial anti-alias rendering not been used. Two examples of spatial anti-alias rendering include Multi-Sample Anti-Alias (MSAA) rendering and Supersampling Anti-Alias rendering. Otherwise described, spatial anti-alias rendering is a technique to obtain higher quality rendering (e.g., higher resolution rendering) in which multiple samples of a pixel is generated and used during rendering. There can be different sample levels. For example, a sample level may be N sample levels, where greater than or equal to zero. As an example, a sample level of 2 refers to two samples per pixel being generated and used during rendering. As another example, a sample level of 4 refers to four samples per pixel being generated and used during rendering. As another example, no MSAA or 1×MSAA (e.g., a sample level of one for MSAA) may be a special case where the number of samples per pixel is equal to one (i.e., meaning that there is no upsampling). In spatial anti-alias rendering, the memory to which graphical content is being rendered is accessed for each sample. Therefore, as the sample level goes up, so too does the memory access overhead for rendering the graphical content using spatial anti-alias rendering.

In some examples, rendering graphical content to a framebuffer may refer to writing pixel values to the framebuffer. A pixel value may have one or more components, such as one or more color components. Each component may have a corresponding value. For example, a pixel in the red, green, and blue color space may have a red color component value, a greed color component value, and a blue color component value.

The third processing unit 108 may be configured to perform one or more display processing processes 122 in accordance with the techniques described herein. For example, the third processing unit 108 may be configured to perform one or more display processing techniques on one or more frames generated by the second processing unit 106 before presentment by the display 103. Otherwise described, the third processing unit 108 may be configured to perform display processing. In some examples, the one or more display processing processes 122 may include one or more of a rotation operation, a blending operation, a scaling operating, any display processing process/operation, or any process/operation described herein with respect to the third processing unit 108.

In some examples, the one or more display processing processes 122 include any process/operation described herein with respect to the third processing unit 108. The display 103 may be configured to display content that was generated using the display processing pipeline 102. For example, the second processing unit 106 may generate graphical content based on commands/instructions received from the first processing unit 104. The graphical content may include one or more layers. Each of these layers may constitute a frame of graphical content. The third processing unit 108 may be configured to perform composition on graphical content rendered by the second processing unit 106 to generate display content. Display content my constitute a frame for display. The frame for display may include two or more layers/frames that were blended together by the third processing unit 108.

The device 100 may include or be connected to one or more input devices 113. In some examples, the one or more input devices 113 may include one or more of: a touch screen, a mouse, a peripheral device, an audio input device (e.g., a microphone or any other visual input device), a visual input device (e.g., a camera, an eye tracker, or any other visual input device), any user input device, or any input device configured to receive an input from a user. In some examples, the display 103 may be a touch screen display; and, in such examples, the display 103 constitutes an example input device 113.

In the example of FIG. 1A, the one or more input devices 113 is shown as including an eye gaze input device 113-1. The eye gaze input device 113-1 may be configured to determine where a user of device 100 is looking, such as where a user is looking on a display (e.g., the display 103). Otherwise described, the eye gaze input device 113-1 may be configured to generate information indicative of an eye gaze region. The eye gaze region may be a region where the user of the device 100 is looking. In some examples, the eye gaze region may be referred to as a fovea/foveated region or a fixation point region. The information indicative of an eye gaze region may include information indicative of one or more regions, such as the eye gaze region (e.g., a fovea region) and/or one or more regions outside of the eye gaze region (e.g., a peripheral region). In some examples, the peripheral region may be the region that falls outside of the eye gaze region.

The eye gaze input device 113-1 may be configured to provide the information indicative of the eye gaze region to the first processing unit 104 and/or the second processing unit 106. In some examples, the first processing unit 104 may be configured to receive the information indicative of the eye gaze region from the eye gaze input device 113-1 and further process the information to generate processed information indicative of the eye gaze region. For example, the first processing unit 104 may be configured to adjust the size of the eye gaze region corresponding to the information indicative of the eye gaze region received from the eye gaze input device 113-1. In other examples, the first processing unit 104 may be configured to receive the information indicative of the eye gaze region from the eye gaze input device 113-1 and forward it to the second processing unit 106. In accordance with the techniques described herein, the second processing unit 106 may be configured to receive information indicative of an eye gaze region from any component, such as the first processing unit 104 or the eye gaze input device 113-1. The information indicative of an eye gaze region received by the second processing unit 106 may be generated by the eye gaze input device 113-1 and processed by zero or more other components before being received by the second processing unit 106.

It is understood that the output of an input device may constitute an input to a component receiving the output from the input device. The eye gaze input device 113-1 may be integrated with the device 100 so that the eye gaze input device 113-1 is configured to detect where a user is looking relative to the display 103.

The display processing pipeline 102 may be configured to execute one or more applications. For example, the first processing unit 104 may be configured to execute one or more applications 120. The first processing unit 104 may be configured to cause the second processing unit 106 to generate content for the one or more applications 120 being executed by the first processing unit 104. Otherwise described, execution of the one or more applications 120 by the first processing unit 104 may cause the generation of graphical content by a graphics processing pipeline 111. For example, the first processing unit 104 may issue or otherwise provide instructions (e.g., draw instructions) to the second processing unit 106 that cause the second processing unit 106 to generate graphical content based on the instructions received from the first processing unit 104. The second processing unit 106 may be configured to generate one or more layers for each application of the one or more applications 120 executed by the first processing unit 104. Each layer generated by the second processing unit 106 may be stored in a buffer (e.g., a framebuffer). Otherwise described, the buffer may be configured to store one or more layers of graphical content rendered by the second processing unit 106. The buffer may reside in the internal memory 107 of the second processing unit 106 and/or the external memory 110 (which may be system memory of the device 100 in some examples). Each layer produced by the second processing unit 106 may constitute graphical content. The one or more layers may correspond to a single application or a plurality of applications. The second processing unit 106 may be configured to generate multiple layers of content, meaning that the first processing unit 104 may be configured to cause the second processing unit 106 to generate multiple layers of content.

Figure 1B:
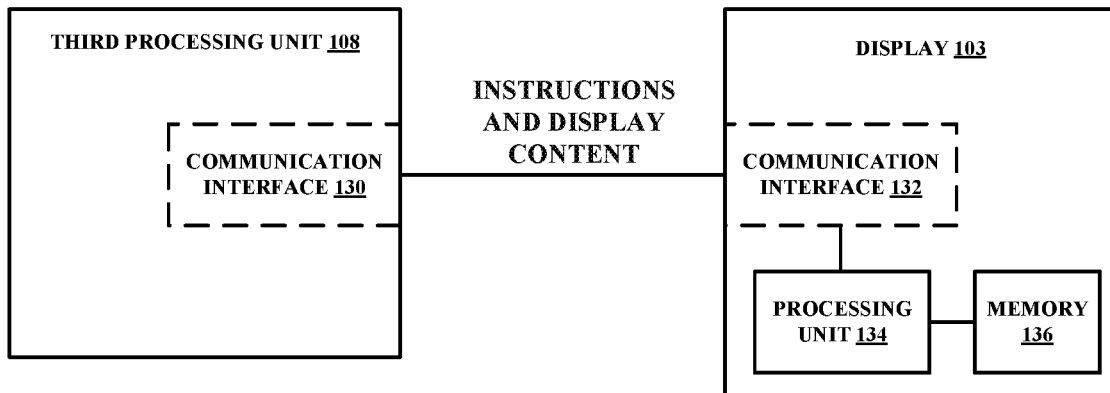
FIG. 1B is a block diagram that illustrates an example configuration between a component of the device depicted in FIG. 1A and a display.

FIG. 1B is a block diagram that illustrates an example configuration between the third processing unit 108 of the device and the display 103. The example of display 103 in FIG. 1B is an example of a smart panel or a command mode panel. The third processing unit 108 and the display 103 may be configured to communicate with each other over a communication medium (e.g., a wired and/or wireless communication medium). For example, the third processing unit 108 may include a communication interface 130 (e.g., a bus interface) and the display 103 may include a communication interface 132 (e.g., a bus interface) that enables communication between each other. In some examples, the communication between the third processing unit 108 and the display 103 may be compliant with a communication standard, communication protocol, or the like. For example, the communication between the third processing unit 108 and the display 103 may be compliant with the Display Serial Interface (DSI) standard. In some examples, the third processing unit 108 may be configured to provide data (e.g., display content) to the display 103 for presentment thereon. The third processing unit 108 may also be configured to provide commands/instructions to the display 103, such as when the display 103 is a command mode display. The display 103 may include a processing unit 134 and a memory 136 accessible by the processing unit 134. The processing unit 134 may be referred to as a display controller. The memory 136 may be configured to store data that the display 103 receives from the third processing unit 108. For example, the memory 136 may be configured to store (e.g., buffer) frames received from the third processing unit 108. The processing unit 134 may be configured to read data stored in the memory 136 that was received from the third processing unit 108 and drive the display 103 based on one or more commands received from the third processing unit 108.

Figure 1C:
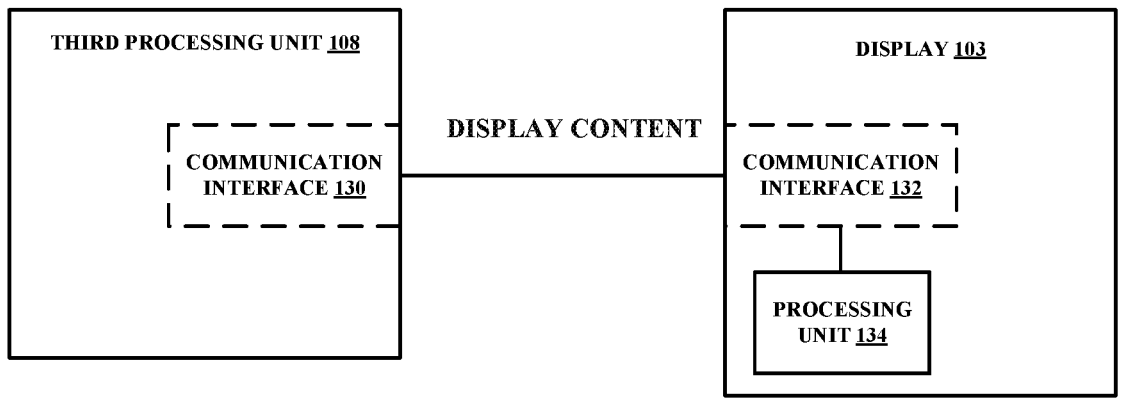
FIG. 1C is a block diagram that illustrates an example configuration between a component of the device depicted in FIG. 1A and a display.

FIG. 1C is a block diagram that illustrates an example configuration between the third processing unit 108 of the device and the display 103. The example of display 103 in FIG. 1C is an example of a dumb panel or a video mode panel. The third processing unit 108 and the display 103 may be configured to communicate with each other over a communication medium (e.g., a wired and/or wireless communication medium). For example, the third processing unit 108 may include a communication interface 130 (e.g., a bus interface) and the display 103 may include a communication interface 132 (e.g., a bus interface) that enables communication between each other. In some examples, the communication between the third processing unit 108 and the display 103 may be compliant with a communication standard, communication protocol, or the like. For example, the communication between the third processing unit 108 and the display 103 may be compliant with the DSI standard. In some examples, the third processing unit 108 may be configured to provide data (e.g., display content) to the display 103 for presentment thereon. The display 103 may include a processing unit 134 and may not include a memory. The processing unit 134 may be referred to as a display driver. The processing unit 134 may be configured to cause the display content received from the third processing unit 108 to be displayed on the display 103.

In some examples, one or more components of the device 100 and/or display processing pipeline 102 may be combined into a single component. For example, one or more components of the display processing pipeline 102 may be one or more components of a system on chip (SoC), in which case the display processing pipeline 102 may still include the first processing unit 104, the second processing unit 106, and the third processing unit 108; but as components of the SoC instead of physically separate components. In other examples, one or more components of the display processing pipeline 102 may be physically separate components that are not integrated into a single component. For example, the first processing unit 104, the second processing unit 106, and the third processing unit 108 may each be a physically separate component from each other. It is appreciated that a display processing pipeline may have different configurations. As such, the techniques described herein may improve any display processing pipeline and/or display, not just the specific examples described herein.

In some examples, one or more components of the display processing pipeline 102 may be integrated into a motherboard of the device 100. In some examples, one or more components of the display processing pipeline 102 may be may be present on a graphics card of the device 100, such as a graphics card that is installed in a port in a motherboard of the device 100 or a graphics card incorporated within a peripheral device configured to interoperate with the device 100.

The first processing unit 104, the second processing unit 106, and/or the third processing unit 108 may include one or more microprocessors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. In examples where the techniques described herein are implemented partially in software, the software (instructions, code, or the like) may be stored in a suitable, non-transitory computer-readable storage medium accessible by the processing unit. The processing unit may execute the software in hardware using one or more processors to perform the techniques of this disclosure. For example, one or more components of the display processing pipeline 102 may be configured to execute software. The software executable by the first processing unit 104 may be stored in the internal memory 105 and/or the memory 110. The software executable by the second processing unit 106 may be stored in the internal memory 107 and/or the memory 110. The software executable by the third processing unit 108 may be stored in the internal memory 109 and/or the memory 110.

As described herein, a device, such as the device 100, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an AR device, or a VR device), a non-wearable device (e.g., a non-wearable AR device or a non-wearable VR device), any AR device, any VR device, a display (e.g., display device), a television, a television set-top box, an intermediate network device, a digital media player, a video streaming device, a content streaming device, an in-car computer, any mobile device, any device configured to generate content, or any device configured to perform one or more techniques described herein. In some examples, the device 100 may be an apparatus. The apparatus may be a processing unit, an SOC, or any device.

As described herein, devices, components, or the like may be described herein as being configured to communicate with each other. For example, one or more components of the display processing pipeline 102 may be configured to communicate with one or more other components of the device 100, such as the display 103, the memory 110, and/or one or more other components of the device 100 (e.g., one or more input devices). One or more components of the display processing pipeline 102 may be configured to communicate with each other. For example, the first processing unit 104 may be communicatively coupled to the second processing unit 106 and/or the third processing unit 108. As another example, the second processing unit 106 may be communicatively coupled to the first processing unit 104 and/or the third processing unit 108. As another example, the third processing unit 108 may be communicatively coupled to the first processing unit 104 and/or the second processing unit 106.

As described herein, communication may include the communicating of information from a first component to a second component (or from a first device to a second device). The information may, in some examples, be carried in one or more messages. As an example, a first component in communication with a second component may be described as being communicatively coupled to or otherwise with the second component. For example, the first processing unit 104 and the second processing unit 106 may be communicatively coupled. In such an example, the first processing unit 104 may communicate information to the second processing unit 106 and/or receive information from the second processing unit 106.

In some examples, the term "communicatively coupled" may refer to a communication connection, which may be direct or indirect. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. In some examples, a communication connection may enable the communication of information (e.g., the output of information, the transmission of information, the reception of information, or the like). In some examples, the term "communicatively coupled" may refer to a temporary, intermittent, or permanent communication connection.

Any device or component described herein may be configured to operate in accordance with one or more communication protocols. For example, a first and second component may be communicatively coupled over a connection. The connection may be compliant or otherwise be in accordance with a communication protocol. As used herein, the term "communication protocol" may refer to any communication protocol, such as a communication protocol compliant with a communication standard or the like. As an example, a communication protocol may include the DSI protocol. DSI may enable communication between the third processing unit 108 and the display 103 over a connection, such as a bus.

Figure 2A:
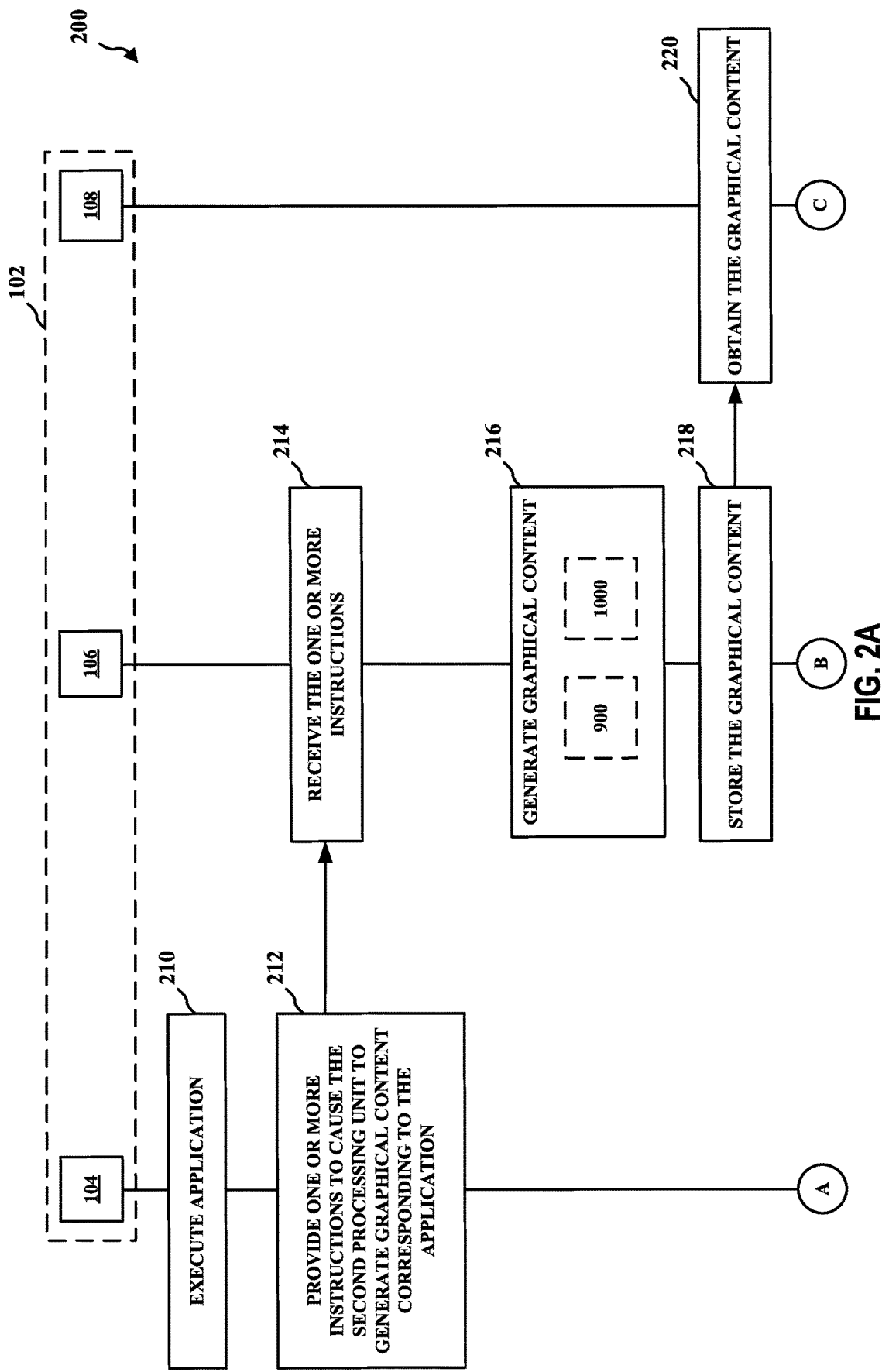
FIGS. 2A-2B illustrate an example flow diagram in accordance with the techniques described herein.
Figure 2B:
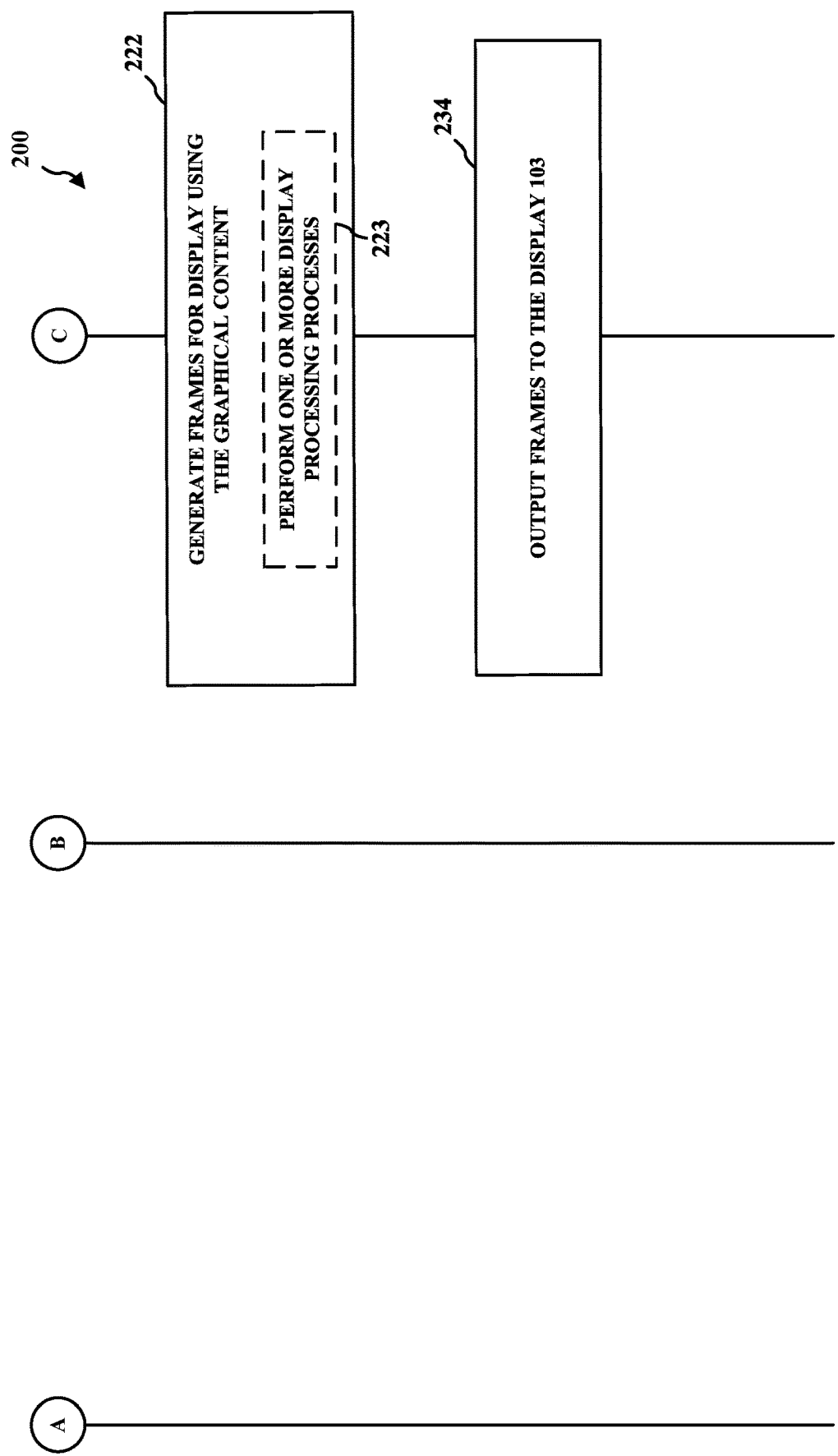

FIGS. 2A-B illustrate an example flow diagram 200 in accordance with the techniques described herein. In other examples, one or more techniques described herein may be added to the flow diagram 200 and/or one or more techniques depicted in the flow diagram may be removed. One or more blocks shown in FIGS. 2A-B may be performed in parallel.

In the example of FIGS. 2A-B, at block 210, the first processing unit 104 may be configured to execute an application. At block 212, the first processing unit 104 may be configured to provide one or more instructions to the second processing unit 106 to cause the second processing unit 106 to generate graphical content corresponding to the application. At block 214, the second processing unit 106 may be configured to receive the one or more instructions.

At block 216, the second processing unit 106 may be configured to generate the graphical content based on the one or more instructions received from the first processing unit 104. For example, the second processing unit 106 may be configured to generate the graphical content at block 216 in accordance with one or more techniques described herein, such as in accordance with the example flowchart 900 and/or the example flowchart 1000. As another example, the second processing unit 106 may be configured to generate the graphical content at block 216 in accordance with one or more techniques described herein with respect to FIGS. 9 and 10. The graphical content may include one or more frames. A frame may include one or more surfaces.

At block 218, the second processing unit 106 may be configured store the generated graphical content (e.g., in the internal memory 107 and/or the memory 110) as described herein. Therefore, block 218 generally represents that rendered graphical content may be stored in one or more memories during rendering. For example, the second processing unit 106 may be configured to use the internal memory 107 and/or the memory 110 to store rendered graphical content. To the extent the internal memory 107 is used to store rendered graphical content, the second processing unit 106 may be configured store the rendered graphical content from the internal memory 107 to the memory 110. The location in the memory 110 at which the rendered graphical content is stored may be referred to as a framebuffer.

At block 220, the third processing unit 208 may be configured to obtain the generated graphical content from a framebuffer. For example, the third processing unit 208 may be configured to obtain one or more frames of generated graphical content from the memory 110. At block 222, the third processing unit 208 may be configured to generate frames for display using the generated graphical content obtained from the framebuffer. To generate display content, the third processing unit 108 may be configured to perform one or more display processing processes 223 (e.g., composition display processes, such as blending, rotation, or any other composition display process) on the generated graphical content read from the framebuffer. At block 234, the third processing unit 108 may be configured to output display content to the display 103.

Applications will often perform a depth pre-pass to render a depth buffer and then render a color surface, in two passes, prior to creating the actual frame buffer, in an attempt to optimize rendering performance. A first pass is performed to render the depth, and a second pass is performed to render the color. Populating the depth buffer first allows each actual frame buffer pixel to be processed only once, regardless of render order, because the depth buffer may be configured to cull out pixels after vertex processing that are later overwritten. Generating a complete depth buffer first may save processing resources (e.g., coloring or shading) on any non-visible pixels, because the non-visible pixels are culled and may be ignored. The color render pass may be a complex operation and rendering the depth surface first screens out pixels that will later be covered up by occluding objects. However, the information generated during the rendering of the depth and/or the color may not be efficiently utilized.

Thus, there exists a need to provide a mechanism to efficiently utilize information generated during the graphics processing pipeline to efficiently generate graphical content.

Figure 3A:
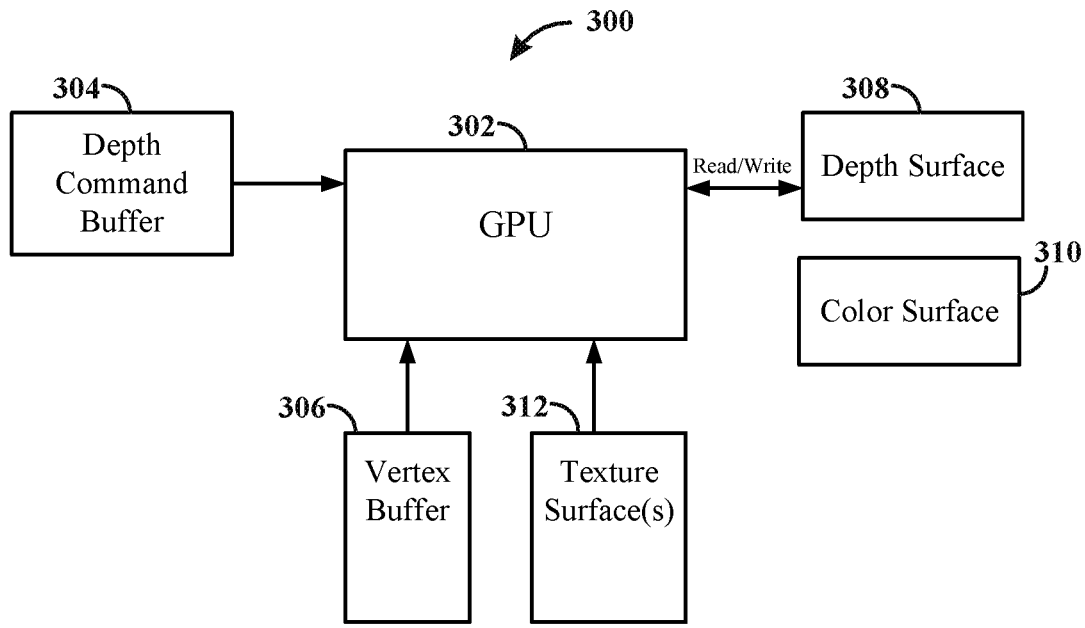
FIGS. 3A-3B illustrate an example hardware architecture in accordance with one or more techniques of this disclosure.

FIG. 3A provides an example hardware architecture 300 in accordance with one or more techniques of this disclosure. FIG. 3A provides an example hardware architecture 300 of the first pass for the depth pre-pass. The architecture 300 includes a GPU 302, a depth command buffer 304, a vertex buffer 306, a depth buffer 308, a color surface 310, and a texture surface 312. The depth command buffer 304 provides a set of commands/instructions to the GPU 302 to generate graphical content with respect to the depth. The vertex buffer 306 is configured to store information related to vertices and are organized into primitives. The first pass of the depth pre-pass results in populating the depth buffer or depth surface 308, such that the depth surface 308 stores information related to the surface. The information stored within the depth surface 308 may be updated and/or read into the GPU 302. The color surface 310 is configured to store information related to the coloring of the surfaces, but no color rendering is performed in the first pass. The texture surfaces 312 is configured to store information related to the texturing of the surfaces.

Figure 3B:
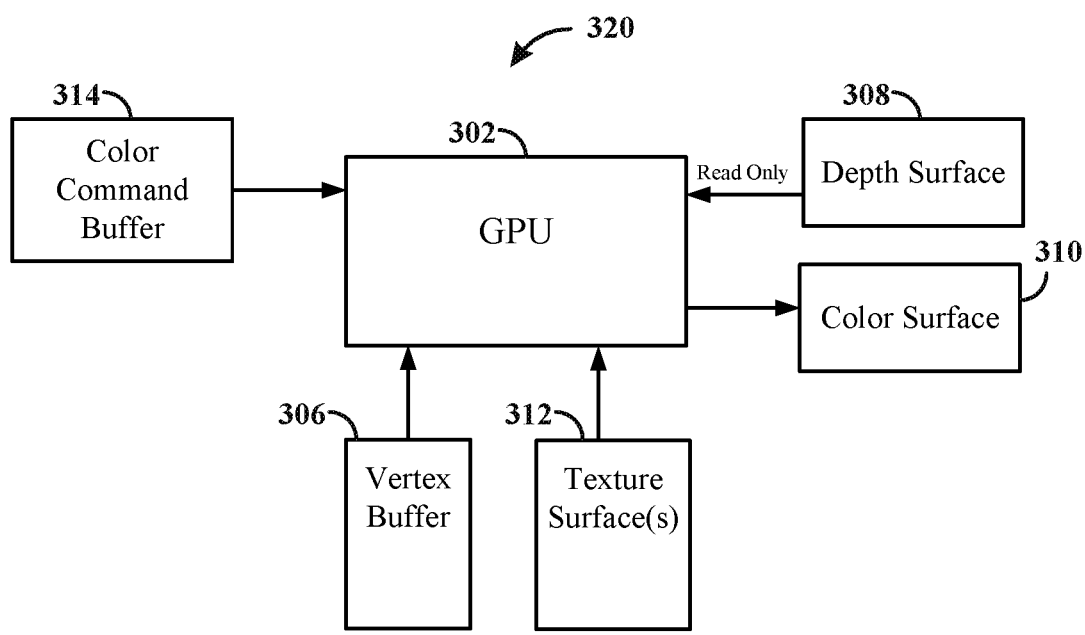

FIG. 3B provides an example hardware architecture 320 in accordance with one or more techniques of this disclosure. FIG. 3B provides an example hardware architecture 320 of the second pass of the depth pre-pass. The architecture 320 may include some of the same components of the example of architecture 300. The architecture 320 may include the GPU 302, a color command buffer 314, the vertex buffer 306, the depth surface 308, the color surface 310, and the texture surface 312. The color command buffer 314 provides a set of commands/instructions to the GPU 302 to generate graphical content with respect to the color. The contents of the depth buffer or depth surface 308 may only be inputted into the GPU 302 during the color render pass, such that any non-visible pixels are culled and processing time and/or resources are not wasted on coloring non-visible pixels.

Having a fully rendered depth surface prior to rendering the color surface can result in the occluded objects not being rendered, because the occluded or non-visible objects fail the depth test and do not get to the shader. This can save processing time and/or resources associated with underlying surfaces that are not seen in the final frame. Rendering the surface first reveals surfaces that will be covered and/or occluded, and the covered and/or occluded surfaces do not get rendered and are not part of the shader processing, which prevents wasting resources to shade objects that are not part of the final frame.

Figure 4:
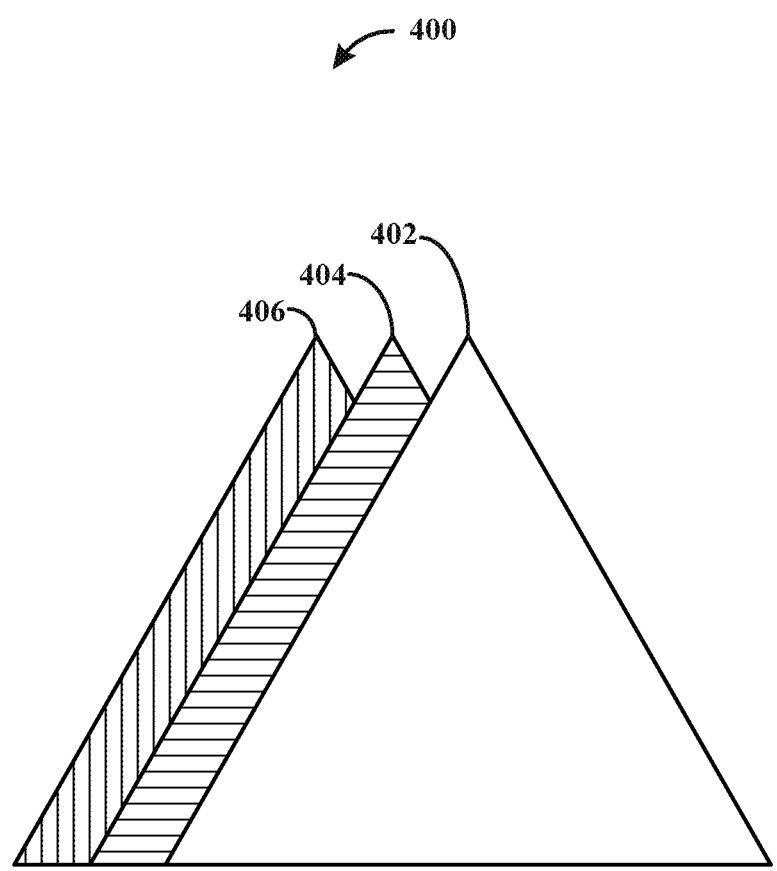
FIG. 4 illustrates an example of a processed image in accordance with one or more techniques of this disclosure.

FIG. 4 provides an example 400 rendering of an image. The image may include three triangles 402, 404, and 406. In some examples, the triangles may be drawn in a back to front order, with triangle 406 drawn first, then triangle 404 is drawn second, and then triangle 402 is drawn last. In instances where the application does not perform a depth pre-pass, all three triangles 402, 404, and 406 will be fully processed and shaded. As seen in FIG. 4, triangles 404 and 406 are covered, in part, by triangle 402. Drawing all three triangles in the back to front order without performing a depth pre-pass results in wasting processing resources because only part of triangles 404 and 406 are visible in the final frame.

In some examples where the triangles are drawn in the back to front order and the application performs a depth pre-pass, the non-visible portions of triangles 404 and 406 will be culled quickly in the pipeline processes, such that only triangle 402 is fully processed. The first pass of the depth pre-pass may be able to identify the non-visible portions of triangles 404 and 406, such that the non-visible portions may be skipped and are not rendered, which saves processing resources. The first pass may identify the visible portions of triangles 404 and 406, which may in turn save processing resources during the second pass or the color render pass, because the non-visible portions of triangles 404 and 406 do not need to be colored.

In a binning architecture, this style of rendering permits hardware to perform additional optimizations to improve performance further by eliminating additional processing steps (e.g., vertex processing) as well. In binning architectures, the depth and color passes may each be converted into two passes: a binning/visibility pass and a render pass. The depth passes may include a depth visibility pass and a depth render pass. The color passes may include a color visibility pass and a color render pass. The processing unit (e.g., GPU), during the depth visibility pass, may be configured to generate the visibility information associated with the depth, and may be configured to generate the visibility information associated with the color during the color visibility pass. The GPU may divide the frame into a plurality of bins, and generate visibility information for the plurality of bins, but the visibility information is generated only once for the frame, and not on a per bin basis. During the depth render pass, the GPU renders, on a per bin basis, each of the bins using the respective visibility information generated during the depth visibility pass. During the color render pass, the GPU renders, on a per bin basis, each of the bins using the respective visibility information generated during the color visibility pass.

Figure 5A:
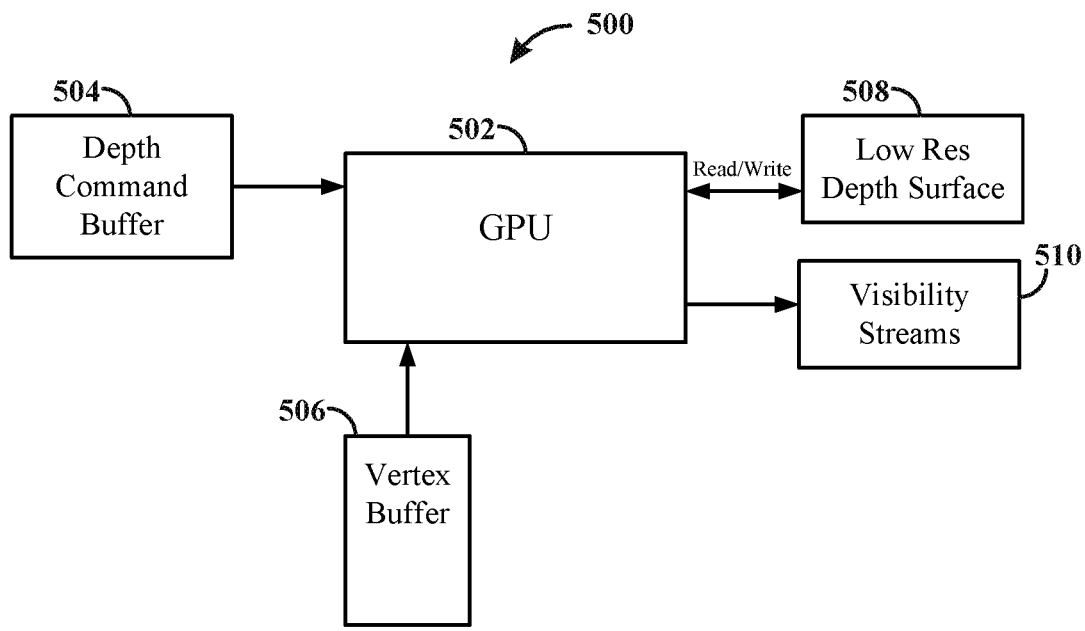
FIGS. 5A-5B illustrate an example hardware architecture in accordance with one or more techniques of this disclosure.
Figure 5B:
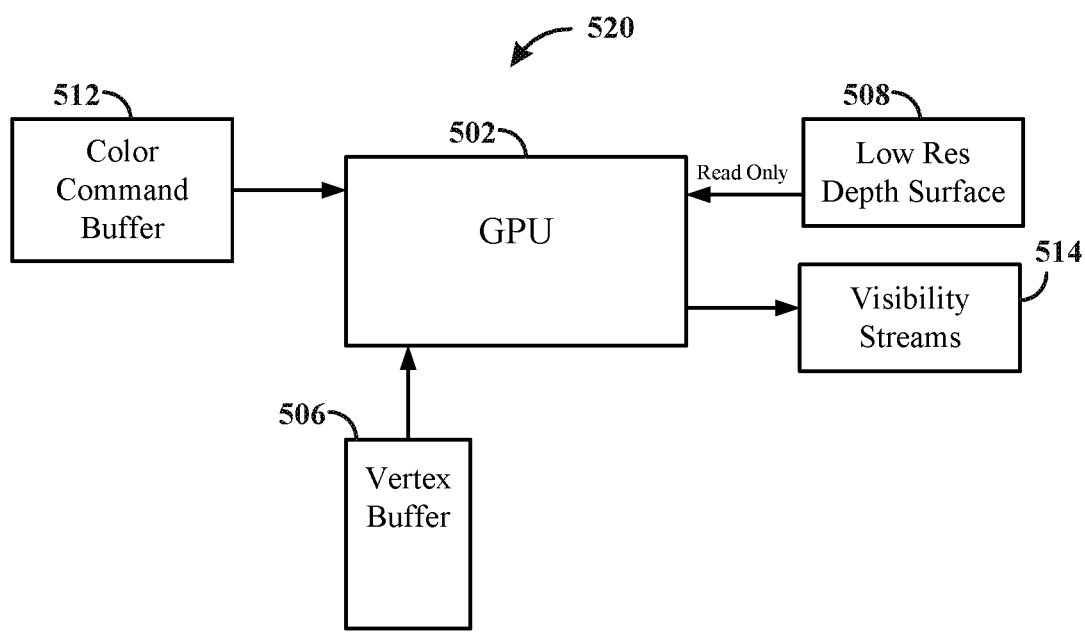

FIGS. 5A-5B illustrate an example hardware architecture 500, 520 in accordance with one or more techniques of this disclosure. FIG. 5A illustrates an example hardware architecture 500 of a visibility pass for depth. FIG. 5B illustrates an example hardware 520 architecture of a visibility pass for color. The disclosure is not intended to be limited to the binning architecture aspects of FIGS. 5A-5B. In some aspects, the hardware architecture may be arranged to generate graphical content using different types of processing techniques, such as but not limited to direct rendering, adaptive rendering, foveated rendering, spatial anti-alias rendering, and/or any graphics processing technique.

FIG. 5A discloses a hardware architecture 500 configured to perform a visibility pass for depth (e.g., application requested depth pre-pass). The architecture 500 may include a GPU 502 (e.g., second processing unit 106), a depth command buffer 504, a vertex buffer 506, a low res depth surface 508, and visibility streams 510. The depth command buffer 504 and vertex buffer 506 may be configured to operate in a manner similar to the depth command buffer 304 and vertex buffer 306. In a depth visibility pass the GPU 502 may be configured to generate visibility information associated with the depth. The output of the depth visibility pass may generate the low resolution depth surface (e.g., LRZ buffer), which may be a low resolution representation of the depth surface, and is stored in the low res depth surface 508. The low res depth surface 508 may be updated and/or read into the GPU 502 during the depth visibility pass. In addition, the depth visibility pass may also generate visibility information for each bin of a plurality of bins, indicating which primitives is visible and/or may be visible with respect to the bin for which the visibility information was generated, and may be stored in visibility streams 510. In some examples, the GPU 502 may be configured to generate multiple visibility streams in parallel for each bin of the plurality of bins. In some examples, the GPU 502 may be configured to generate the visibility streams one at a time for each of the plurality of bins.

FIG. 5B discloses a hardware architecture 520 configured to perform a visibility pass for color (e.g., application requested color pass). The architecture 520 includes the GPU 502, the vertex buffer 506, the low res depth surface 508, a color command buffer 512, and visibility streams 514. The color command buffer 512 may be configured to operate in a manner similar to the color command buffer 314. In a color visibility pass, the GPU 502 may be configured to generate visibility information associated with the color. The output of the color visibility pass may include generating a final visibility stream that may include the results of any late occluders. The low res depth surface 508 may be read as input by the GPU 502 during the color visibility pass when the visibility streams are being generated. The final visibility streams are stored in the visibility streams 514.

In some examples, the visibility and render passes may be performed as single passes with two halves. For example, the GPU, during the first half of the visibility pass may generate the visibility information associated with the depth, and during the second half of the visibility pass the GPU may generate the visibility information associated with the color. During the first half of the render pass, the GPU may render the visibility information associated with the depth, and during the second half of the render pass, the GPU may render the visibility information associated with the color. In some examples, the visibility and render passes may be performed as two separate passes. In such examples, the GPU may generate, during the first half of the first pass, visibility information associated with the depth, and during the second half of the first pass, the GPU may render the visibility information associated with the depth. During the first half of the second pass, the GPU may generate visibility information associated with the color, and during the second half of the second pass, the GPU may render the visibility information associated with the color.

Figure 6A:
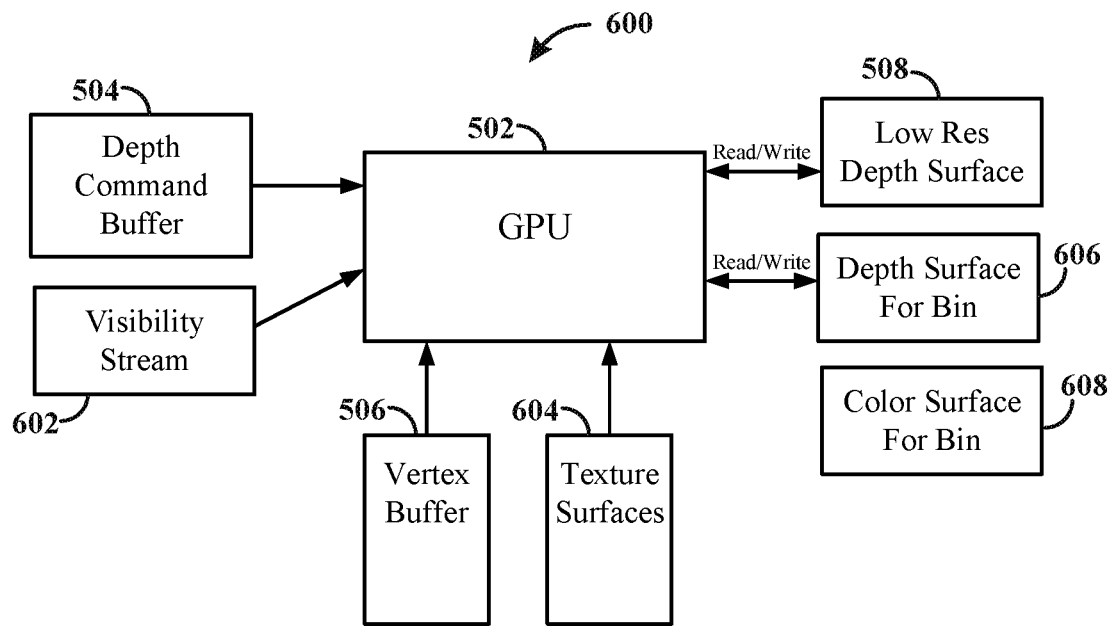
FIGS. 6A-6B illustrate an example hardware architecture in accordance with one or more techniques of this disclosure.
Figure 6B:
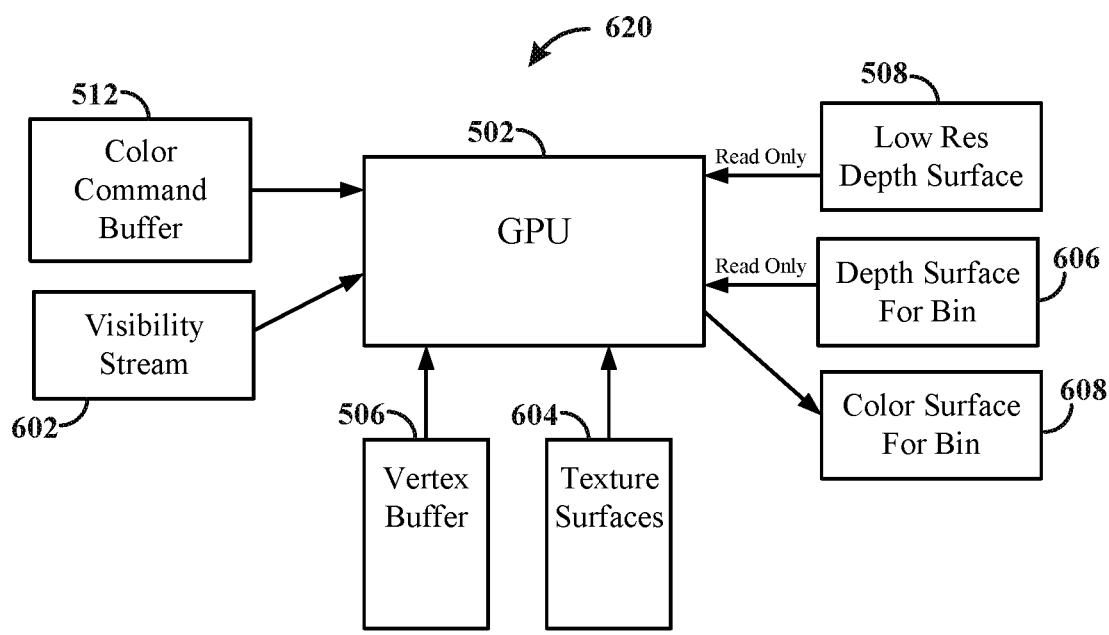

FIGS. 6A-6B illustrate an example hardware architecture 600, 620 in accordance with one or more techniques of this disclosure. FIG. 6A illustrates an example hardware architecture 600 configured to perform a render pass for depth. FIG. 6B illustrates an example hardware 620 architecture configured to perform a render pass for color.

FIG. 6A discloses a hardware architecture 600 configured to perform a render pass of a depth pre-pass (e.g., application requested depth pre-pass). The architecture 600 may include some of the components disclosed in the architecture 500 of FIG. 5A, such that the same numerals will be used herein for the same or similar components. The architecture 600 may include the GPU 502 (e.g., second processing unit 106), the depth command buffer 504, the vertex buffer 506, the low res depth surface 508, visibility stream 602, texture surfaces 604, depth surface for bin 606. Texture surface 604 may be configured to operate in a manner similar to the texture surface 312. The depth surface for bin 606 may be configured to operate in a manner similar to the depth surface 308, however, the depth surface for bin 606 stores information related to the surface on a per bin basis. The instructions from the depth command buffer 504 may be inputted into the GPU 502, along with one or more of the visibility stream 602, vertex buffer 506, texture surfaces 604, low res depth surface 508, and depth surface for bin 606. The GPU 502 may be configured to update the low res depth surface 508 and/or the depth surface for bin 606 during and/or upon completion of the depth render pass. The visibility stream 602 inputted into the GPU 502 during the depth render pass may be the visibility stream 510 generated during the depth visibility pass or the visibility stream 514 generated during the color visibility pass.

FIG. 6B discloses a hardware architecture 620 configured to perform a render pass of a color pass (e.g., application requested color pass). The architecture 620 may include some of the components disclosed in the architecture 520 of FIG. 5B. The architecture 620 includes the GPU 502 (e.g., second processing unit 106), the color command buffer 512, the vertex buffer 506, the low res depth surface 508, visibility stream 602, texture surfaces 604, depth surface for bin 606, and color surface for bin 608. The color surface for bin 608 may be configured to operate in a manner similar to the color surface 310, however, the color surface for bin 608 stores information related to the coloring of the surfaces on a per bin basis. The instructions from the color command buffer 512 may be inputted into the GPU 502, along with one or more of the vertex buffer 506, texture surfaces 604, low res depth surface 508, and/or depth surface for bin 606. The low res depth surface 508 is not updated by the GPU 502 during the color render pass, because the information with regards to the depth has been determined before the color render pass. In addition, the depth surface for bin 606 is also not updated by the GPU 502 during the color render pass, for at least the same reasons as the low res depth surface 508. The visibility stream 602 inputted into the GPU 502 during the color render pass may be the visibility stream 514 generated during the color visibility pass. In some examples, the visibility stream 602 inputted into the GPU 502 during the color render pass may be the visibility stream 510 generated during the depth visibility pass.

At least one advantage of the architectures 500, 520, 600, and 620 is that, with reference to FIG. 4, processing workload on triangles 404 and 406 may also be reduced, because pixels may be culled early in the graphics pipeline process for triangles 404 and 406. In addition, vertex processing workload may be minimized and/or eliminated for the culled triangles 404 and 406 due to the visibility stream produced during the depth visibility pass, which results in an additional savings of processing resources. The additional savings of processing resources may lead to a reduction of work needed to be performed, which in turn may speed up the processing time for the frame.

In accordance with the techniques described herein, the second processing unit 106 may be configured to more efficiently generate graphical content. In some examples, the second processing unit 106 may be configured to improve performance of a depth pre-pass. In some examples, the second processing unit 106 may be configured to improve performance of a color pass.

Figure 7:
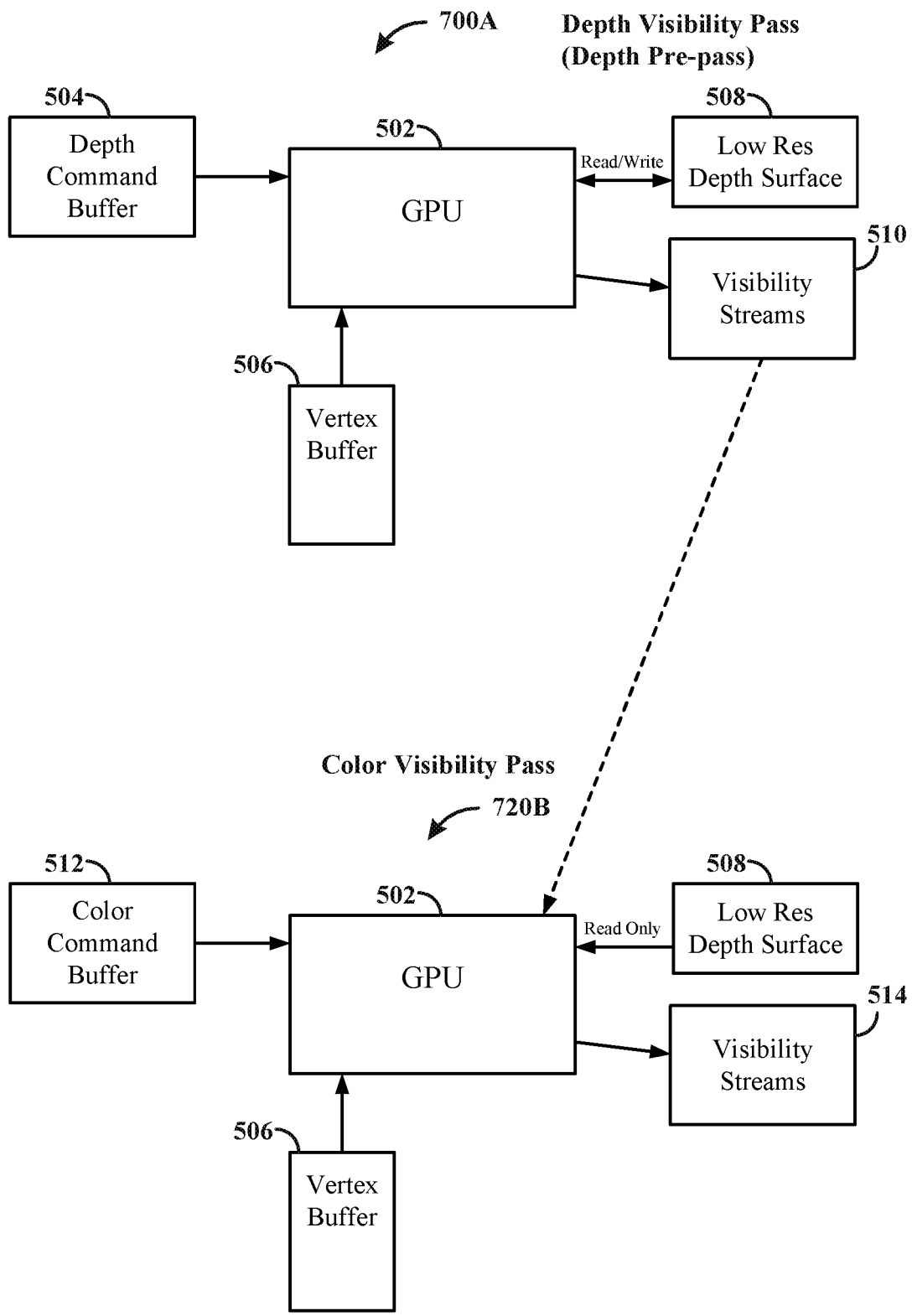
FIG. 7 illustrates example hardware architecture in accordance with one or more techniques of this disclosure.

FIG. 7 illustrates example hardware architectures 700A, 720B in accordance with one or more techniques of this disclosure. The architecture 700A of FIG. 7 may be similar to the architecture 500 of FIG. 5A. The architecture 720B of FIG. 7 may have some of the same components as the architecture 520 of FIG. 5B. However, as discussed in further detail below, the architecture 720B of FIG. 7 may be configured to receive as input the visibility stream 510 generated by the GPU 502 of architecture 700A during the depth visibility pass. The GPU 502 of architecture 720B, receiving the visibility stream 510 as input during the color visibility pass, may be configured to generate a visibility stream 514 that may incorporate information from the visibility stream 510 generated during the depth visibility pass. In the architectures 500, 520 of FIGS. 5A and 5B, the visibility stream 510 may not be utilized by the GPU 502 during the color visibility pass. However, in accordance with aspects described herein, the GPU 502 of architecture 720B may be configured to receive the generated visibility stream 510 during the color visibility pass, in order to generate an improved visibility stream or visibility stream 514.

The information within the visibility stream 514 generated during the color visibility pass may be an improved visibility stream, because the visibility stream 514 incorporates the information in the low res depth surface 508 generated during the depth visibility pass. The visibility stream 514 may allow the GPU 502 to cull pixels earlier in the graphics processing pipeline. As a result, vertex processing may be reduced or eliminated, thereby saving graphics processor resources.

In accordance with the techniques described herein, the second processing unit 106 may be configured to improve processing performance. In some aspects, the second processing unit 106 may be configured to realize improved processor performance when binning is used in conjunction with a depth pre-pass. At least one performance improvement may be directed to the visibility pass. For example, in architecture 700A of FIG. 7, the low res depth surface 508 may be generated by the GPU 502 (e.g., second processing unit 106) during a depth visibility pass of a depth pre-pass. The GPU 502 of architecture 700A may also be configured to generate the visibility steam 510 during the depth visibility pass of the depth pre-pass. In instances where the geometry of the depth visibility pass is identical to the geometry of the color visibility pass, the generated visibility stream 510 may be shared and/or used as input by the GPU 502 of architecture 720B during the color visibility pass, as further shown in FIG. 7. Determining that the geometry is identical between the two visibility passes may be indicated by either the driver or via a 'hint' from the application. As such, the GPU 502 of architecture 720B may receive the visibility stream 510 generated during the depth visibility pass and may be utilized by the GPU 502 of architecture 720B during the color visibility pass of the color pass. The GPU 502 of architecture 720B may be configured to generate the visibility stream 514, based on the generated visibility stream 510. The visibility stream 514 incorporates at least some of the information of the visibility stream 510 generated during the depth visibility pass.

At least one advantage of the disclosure is that processing time and/or resources may be reduced and/or utilized efficiently due, in part, to the GPU 502 of architecture 720B being configured to utilize the generated visibility stream 510 while performing the color visibility pass. The visibility stream 510 generated during the depth visibility pass may be configured to identify primitives that are drawn behind previously drawn objects, in instances of front-to-back rendered, or are backface culled (i.e., facing away from the viewer), or are zero-area. These non-visible primitives may be identified earlier in the graphics pipeline process and may be ignored by the GPU 502 which may save processing time and/or resources. In addition, the GPU 502 may be configured to utilize less processing resources and have a reduced workload during the color visibility pass such that processing power and/or resources may be utilized efficiently. In some examples, the reduced processing resources needed to perform the color visibility pass may be utilized by the GPU 502 to perform other operations that may need increased processing resources.

The GPU 502, in the architecture 720B, being able to use the visibility information generated during the depth visibility pass as input during the color visibility pass provides relevant information to the GPU 502 that allows the GPU 502 to refine or generate an improved visibility information (e.g., visibility stream 514). The visibility information 514 generated during the color visibility pass may be refined and/or improved due in part to the GPU 502 of architecture 720B utilizing the visibility information generated in the depth visibility pass. The GPU 502 of architecture 720B being configured to utilize the visibility information generated during the depth visibility pass during the color visibility pass may eliminate the need for the GPU 502 of architecture 720B to discover the non-visible primitives from the low res depth surface 508 in the color visibility pass, which in turn, may reduce processing time during the color visibility pass. The low res depth surface 508 may be processed on a pixel by pixel basis or coarse pixel by pixel basis, which may take longer for the GPU 502 of architecture 720B to discover. However, utilizing the contents of the visibility information from the depth visibility pass during the color visibility pass may eliminate the need to go down to the pixel level, and in some instances, could eliminate whole primitives.

In some examples, processing performance may be improved by not generating the visibility stream 514 during the color visibility pass, and inputting into the GPU 502 of architecture 720B the visibility information generated during the depth visibility pass while performing the color visibility pass. This may eliminate the need to generate visibility information during the color visibility pass and the GPU 502 of architecture 720B may re-use the generated depth visibility information, which could reduce processing time and/or resources.

In some aspects, the improved visibility information (e.g. color visibility stream 514) generated during the color visibility pass may be inputted into the GPU 502 of FIG. 6A during a depth render pass, instead of using the visibility information generated in the depth visibility pass by the GPU 502 of FIG. 5A. In addition, the improved visibility information (e.g., color visibility streams 514) generated in the color visibility pass may be inputted into the GPU 502 of FIG. 6B during the color render pass. Utilizing the color visibility stream 514 in the GPU 502 of either FIG. 6A or 6B, provides information to the respective GPUs 502 to reduce processor workload, and may improve processing efficiency.

In some aspects, the visibility information (e.g., visibility stream 510) generated during the depth visibility pass may be inputted into the GPU 502 during the depth render pass of FIG. 6A, and in the color render pass of FIG. 6B. In some aspects, the visibility information generated in the depth visibility pass may be inputted into the GPU 502 during the depth render pass of FIG. 6A, while the visibility information (e.g., color visibility stream 514) generated during the color visibility pass may be inputted into the GPU 502 during the color render pass of FIG. 6B. Some advantages of the one or more aspects is that processing time and/or resources may be saved in the color visibility pass, as primitives that are drawn behind previously drawn objects (front-to-back rendered) may be culled or may be zero-area and may not have their visibility bit 'set'.

In some aspects, the second processing unit 106 may be configured to be further optimized and improve performance of a color render pass.

Figure 8:
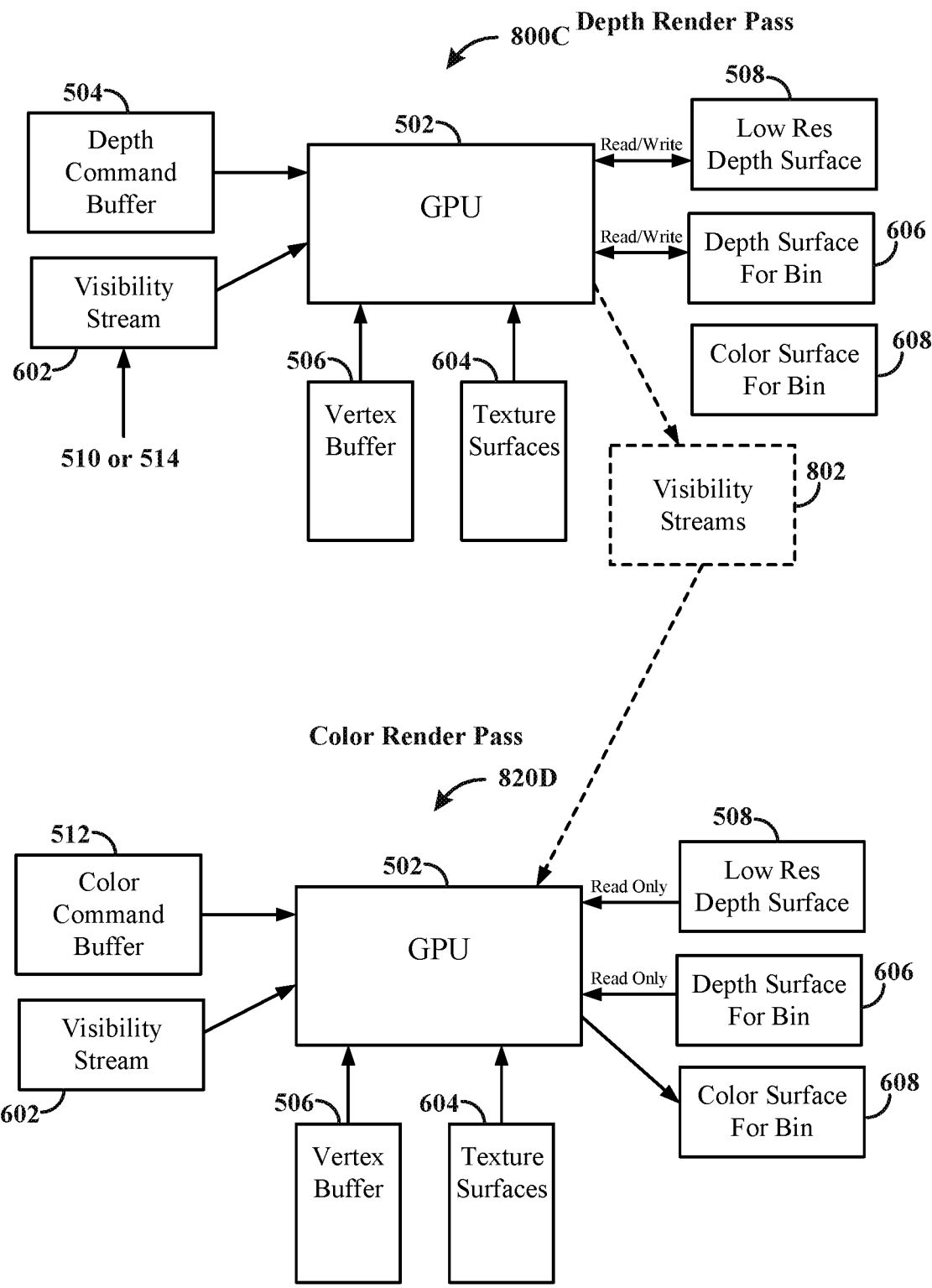
FIG. 8 illustrates example hardware architecture in accordance with one or more techniques of this disclosure

FIG. 8 illustrates example hardware architectures 800C, 820D in accordance with one or more techniques of this disclosure. The architecture 800C of FIG. 8 may be similar to the architecture 600 of FIG. 6A. However, the GPU 502 of architecture 800C may be further configured to generate a new visibility stream 802. The architecture 820D of FIG. 8 may be similar to the architecture 620 of FIG. 6B. However, the GPU 502 of architecture 820D may be further configured to receive, as input, the depth render pass visibility stream 802.

The architecture 800C may be configured to perform a depth render pass of a depth pre-pass. The architecture 820D may be configured to perform a color render pass of a color pass. The disclosure is not intended to be limited to the aspects of FIG. 8. In some aspects, the hardware architecture may be arranged to generate graphical content using different types of processing techniques, such as but not limited to direct rendering, adaptive rendering, foveated rendering, spatial anti-alias rendering, and/or any graphics processing technique.

FIG. 8 discloses a hardware architecture 800C configured to perform the depth render pass of a depth pre-pass (e.g., application requested depth pre-pass). The architecture 800C may include the GPU 502 (e.g., second processing unit 106), the depth command buffer 504, the vertex buffer 506, the low res depth surface 508, visibility stream 602, texture surfaces 604, depth surface for bin 606, and the depth render pass visibility stream 802. The information within the depth command buffer 504 may be inputted into the GPU 502, along with one or more of the visibility stream 602, vertex buffer 506, texture surfaces 604, low res depth surface 508, and depth surface for bin 606. The GPU 502 may be configured to update the low res depth surface 508 and/or the depth surface for bin 606 during or upon completion of the depth render pass.

During the depth render pass, visibility information may be re-generated by the GPU 502 of architecture 800C and produce an updated visibility information as visibility stream 802. At least one advantage of re-generating the visibility information is that the visibility stream 802 may take into account any late z items. Late z items (e.g., tree foliage, etc.) may be common and may allow for the elimination of vertex processing for color pass for objects that are behind such late z items or foliage. The visibility information (e.g., visibility stream 602) inputted into the GPU 502 of FIG. 6A during the depth render pass may not have information related to any late z operations. Late z operations may not be provided in the low res depth surface 508 of FIG. 6A, because a full shader process would need to be performed in order to know information about any late z operations.

The GPU 502 of architecture 800C may be configured to further refine and/or improve the visibility information during the depth render pass. The GPU 502 of architecture 800C may be configured to generate the visibility stream 802 during the depth render pass. The new visibility stream 802 may be refined and/or improved, in part, because the depth surface has been fully rendered during the depth render pass and such information may be incorporated into the visibility stream 802. The GPU 502 may generate the visibility stream 802 based in part on the information related to fully rendered depth surface. The GPU 502 of architecture 800C may be configured to utilize the fully rendered depth surface stored within the depth surface for bin 606 and regenerate the visibility information (e.g., new visibility stream 802), such that the regenerated visibility information may take into account any late z operations. The GPU 502 may be configured to generate the visibility stream 802 that takes into account any objects that are hidden by late z items (e.g., tree foliage). In some instances, the visibility stream 602 inputted into the GPU 502 of architecture 800C, during the depth render pass, may indicate that everything behind tree foliage or other late z items is visible.

The generated visibility stream 802 may be utilized as input by the GPU 502 of architecture 820D in the color render pass, such that the GPU 502 of architecture 820D may be configured to skip items hidden behind foliage or other late z items, which may provide a savings of processor resources. In such instances, the color render pass may be rendered based on the generated visibility stream 802. In some aspects, the visibility stream 602 inputted into the GPU 502 of architecture 800C, during the depth render pass, may be the visibility stream 510 generated by the GPU 502 of architecture 700A of FIG. 7 during the depth visibility pass, such that the depth render pass may be rendered based on the visibility stream 510 generated during the depth visibility pass. In some aspects, the visibility stream 602 inputted into the GPU 502 of architecture 800C, during the depth render pass, may be the visibility stream 514 generated by the GPU of architecture 720B FIG. 7 during the color visibility pass, such that the depth render pass may be rendered based on the visibility stream 514 generated during the color visibility pass. In such instance, the visibility stream 510 may be inputted into the GPU 502 of architecture 720B such that the visibility stream 514 is generated based on the visibility stream 510 during the color visibility pass. In such instance, the color visibility pass may be rendered based on the visibility stream 510 generated by the GPU 502 of architecture 700A during the depth visibility pass. Stated differently, since the visibility stream 510 is used to generate the visibility stream 514, and the visibility stream 514 is used to generate the visibility stream 802 during the depth render pass, the depth render pass may be rendered, indirectly, based on the visibility stream 510.

In yet some aspects, the visibility stream 602 inputted into the GPU 502 of architecture 800C, during the depth render pass, may be the visibility stream 510 generated by the GPU 502 of architecture 700A during the depth visibility pass, such that the visibility stream 802 is based on the visibility stream 510. In such example, the visibility stream 802 may be received as input by the GPU 502 of architecture 720B. The GPU 502 of architecture 720B may generate the visibility stream 514 during the color visibility pass based on the visibility stream 802. Furthermore, the visibility stream 514 generated during the color visibility pass may be received as input by the GPU 502 of the architecture 820D. The GPU 502 of the architecture 820D may render the color render pass based on the visibility stream 514.

FIG. 8 further discloses a hardware architecture 820D configured to perform a color render pass of a color pass (e.g., application requested color pass). The architecture 820D includes the GPU 502 (e.g., second processing unit 106), the color command buffer 512, the vertex buffer 506, the low res depth surface 508, visibility stream 602, texture surfaces 604, depth surface for bin 606, color surface for bin 608. The architecture 820D may be further configured to receive as input the visibility stream 802. The information/commands within the color command buffer 512 is inputted into the GPU 502 of architecture 820D, along with one or more of the vertex buffer 506, texture surfaces 604, low res depth surface 508, and/or depth surface for bin 606. The low res depth surface 508 may not be configured to be updated by the GPU 502 during the color render pass, because the information with regards to the depth has been determined before the color render pass. In addition, the depth surface for bin 606 may not be updated by the GPU 502 during the color render pass, for at least the same reasons as the low res depth surface 508.

As discussed above, the GPU 502 of architecture 800C may be configured to generate the new visibility stream 802, during the depth render pass. The visibility stream 802 may be further refined and take into account late z cases due, in part, to the fully rendered depth surface. The visibility stream 802 may be utilized as input by the GPU 502 of architecture 820D during the color render pass which may provide information to the GPU 502 of architecture 820D that may further optimize utilization of processor resources. The geometry of depth render pass and the geometry of the color render pass may need to be identical in order for the visibility stream 802 to be utilized by the GPU 502 of architecture 820D during the color render pass. Determining that the geometry is identical between the two render passes may be indicated by either the driver or via a 'hint' from the application.

At least one advantage of the disclosure is that the visibility stream 802 may be configured to provide the GPU 502 of architecture 820D with information with regards to any late z cases, such that the GPU 502 may not need to color the late z items that are behind other objects and make the late z items non-visible. As such, the GPU 502 of architecture 820D may be configured to skip such hidden items during the color render pass which may improve processing time, and prevents the coloring of non-visible items. In addition, the GPU 502 of architecture 820D being configured to receive, as input, the visibility stream 802 may be able to identify late z items without having to perform a full shader process, which may further reduce the amount of processor resources expended and further optimize processor performance. The GPU 502 of architecture 820D is, thereby, configured to output the color surface for bin 608 in the color render pass in an efficient manner due in part to utilizing the improved visibility stream 802 regenerated by the GPU 502 of architecture 800C during the depth render pass. As stated above, the visibility stream 802 can be regenerated by the GPU 502 of architecture 800C by using as input the visibility stream 510 or the visibility stream 514.

In some aspects, the GPU 502 of architecture 820D may be configured to receive, as input during the color render pass, visibility information other than the visibility stream 802. For example, the GPU 502 of architecture 820D may be configured to receive input from the visibility stream 602 instead of the depth render pass visibility stream 802. The visibility stream 602 inputted may be, in some aspect, the visibility information 510 generated by GPU 502 of architecture 700A during the depth visibility pass, while in other aspects, the visibility information 514 generated by GPU 502 of architecture 720B during the color visibility pass. The visibility stream 602 inputted into the GPU 502 of architecture 820D, during the color render pass, may include information related to non-visible objects to assist the GPU 502 during the color render pass. Although the visibility stream 602 inputted into the GPU 502 of architecture 820D may not include information to the full extent that is provided by the visibility stream 802, the visibility stream 602 inputted into the GPU 502 of architecture 820D still assists in improving processor performance. In some aspects, the visibility stream 602 inputted into the GPU 502 of architecture 820D during the color render pass may be the visibility information 510 generated during the depth visibility pass or the visibility information 514 generated during the color visibility pass. In some aspects, the visibility stream 602 inputted into the GPU 502 of architecture 800C may be either the visibility information (e.g., visibility stream 510) generated during the depth visibility pass or the visibility information (e.g., visibility stream 514) generated during the color visibility pass, such that the depth render pass may be rendered based on the visibility stream 510 or based on the visibility stream 514, respectively. The inputted visibility information (e.g., visibility stream 510 or 514) may then be utilized by the GPU 502 of architecture 800C during the depth render pass to generate the visibility stream 802.

Figure 9:
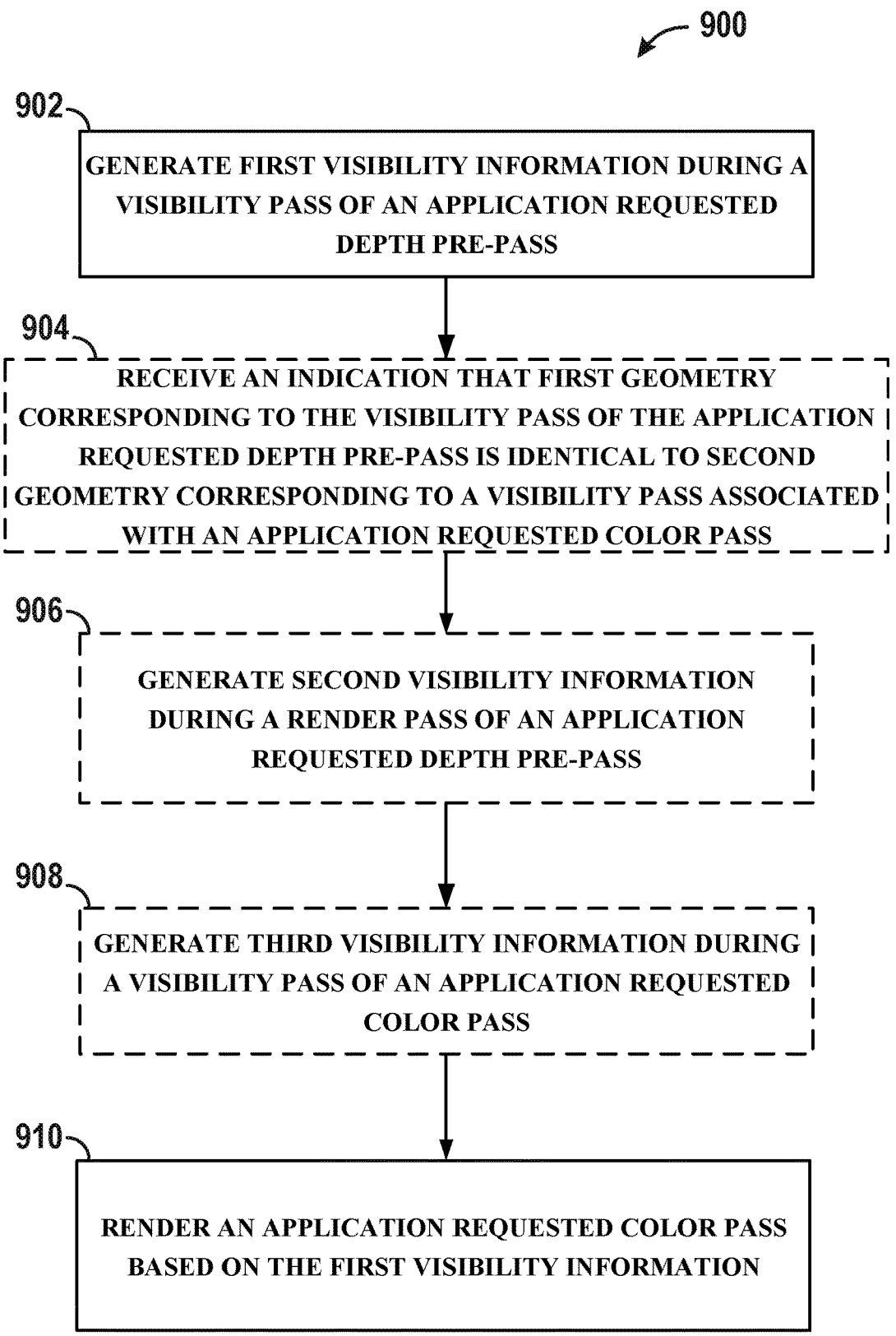
FIG. 9 illustrates an example flowchart of an example method in accordance with one or more techniques of this disclosure.

FIG. 9 illustrates an example flowchart 900 of a method in accordance with one or more techniques of this disclosure. The method may be performed by the second processing unit 106 to generate graphical content as shown in FIG. 2A, 7, or 8. In some examples, the method illustrated in flowchart 900 may include one or more functions described herein that are not illustrated in FIG. 9, and/or may exclude one or more illustrated functions. Optional aspects are illustrated with a dashed line.

At block 902, the second processing unit 106 may be configured to generate first visibility information during a visibility pass of an application requested depth pre-pass, as described in connection with the example in FIG. 7. For example, in architecture 700A of FIG. 7, the GPU 502 may be configured to generate the visibility stream 510 (e.g., first visibility information) during the depth visibility pass. In some examples, the second processing unit 106 may be configured to identify one or more non-visible pixels based on the generated visibility information 510. In such examples, the second processing unit 106 may be configured to cull the non-visible pixels before the application requested color pass is rendered. In such examples, the non-visible pixels may be ignored by the second processing unit 106 during the rendering of the application requested color pass.

At block 904, the second processing unit 106 may be configured to receiving an indication that first geometry corresponding to the visibility pass of the application requested depth pre-pass is identical to second geometry corresponding to a visibility pass associated with an application requested color pass, as described in connection with the example in FIG. 7. For example, the GPU 502 in the architecture 720B of FIG. 7 determines to generate the visibility information 514 during the color visibility pass upon receiving the indication that the first geometry corresponding to the visibility information pass associated with the application requested depth pre-pass is identical to the second geometry corresponding to the visibility pass associated with the application requested color pass. In instances where the first geometry of the depth visibility pass is identical to the second geometry of the color visibility pass, the depth visibility information (e.g., visibility stream 510) generated during the depth visibility pass may be shared and/or used as input by the GPU 502 (e.g., second processing unit 106) of architecture 720B during the color visibility pass, as shown in the example of FIG. 7. In some examples, the indication may be sent by the application, while in other examples, the indication may be sent by a driver.

At block 906, the second processing unit 106 may be configured to generate second visibility information during a render pass associated with an application requested depth pre-pass, as described in connection with the example in FIG. 8. For example, the visibility stream 602 received as input by the GPU 502 in the architecture 800C of FIG. 8 may be the visibility stream 510 (e.g., first visibility information) generated by the GPU 502 of architecture 700A, such that the GPU 502 of architecture 800C may be configured to generate the new visibility stream 802 (e.g., second visibility information) during the render pass of the application requested depth pre-pass. In such example, the new visibility stream 802 may be generated based on the visibility stream 510. In addition, the application requested color pass may be rendered based on the generated visibility information 802. In some examples, Late Z operations identified during the render pass associated with the application requested depth pre-pass may be incorporated into the generated visibility information 802 (e.g., second visibility information). In such examples, vertex processing may be skipped in the render pass associated with the application requested color pass based on the Late Z operations incorporated in the generated visibility information 802. In some examples, depth surfaces may be rendered by the GPU 502 of architecture 800C when generating the visibility information 802, and the application requested color pass may be further rendered based on the rendered depth surfaces.

At block 908, the second processing unit 106 may be configured to generate third visibility information during a visibility pass associated with the application requested color pass, as descried in connection with the example in FIG. 7. For example, the GPU 502 of architecture 720B of FIG. 7 may be configured to generate the visibility stream 514 (e.g., third visibility information) during the color visibility pass. In such examples, the visibility stream 514 may be generated based on the generated depth visibility information (e.g., first visibility information). In addition, the visibility stream 514 may be received as input by the GPU 502 of architecture 800C during the depth render pass to generate the new visibility stream 802 (e.g., second visibility information), such that the new visibility stream 802 is generated based on the visibility stream 514. In some examples the visibility pass associated with the application requested depth pre-pass and the visibility pass associated with the application requested color pass are performed sequentially in the same pass, and the render pass associated with the application requested depth pre-pass and the render pass associated with the application requested color pass are performed sequentially in the same pass. For example, the depth visibility pass may be the first half of the visibility pass and the color visibility pass may be the second half of the visibility pass, while the depth render pass may be the first half of the render pass and the color render pass may be the second half of the render pass.

At block 910, the second processing unit 106 may be configured to render an application requested color pass based on the first visibility information, as described in connection with the example of FIGS. 7 and 8. For example, the GPU 502 of architecture 720B of FIG. 7 may be configured to render the color visibility pass while utilizing, as input, the depth visibility information 510. In some examples, the GPU 502 of architecture 820D of FIG. 8 may be configured to render the color render pass while utilizing the visibility stream 802. The visibility stream 802 may be generated based on the visibility stream 510 (e.g., first visibility information). Since the visibility stream 802 is generated based on the visibility stream 510, and the color render pass may be generated based on visibility stream 802, it follows that the color render pass is generated, indirectly, based the visibility stream 510.

In some examples, the second processing unit 106 may be configured to render a render pass of the application requested depth pre-pass. The second processing unit 106 may be configured to render the render pass of the depth pre-pass based on the color visibility information. In some examples, the color visibility information may be generated during the application requested color visibility pass.

In some examples, the second processing unit 106 may be configured to render a color render pass of the application requested color pass. The second processing unit 106 renders the color render pass based on the color visibility information generated during the application requested color visibility pass. In some examples, the second processing unit 106 may be configured to generate an additional visibility information that may include the results of any late z occluders. In some examples, any late z operations identified during the depth render pass may be incorporated into the generated visibility information 802. In some examples, the second processing unit 106 may be configured to skip vertex processing during the application requested color render pass based on the late z operations incorporated in the generated visibility information 802. In some examples, the second processing unit 106 may be configured to render depth surfaces when generating the visibility information 802. In such instance, the application requested color pass may be further rendered based on the rendered depth surfaces. In some examples, the second processing unit 106 may be configured to identify one or more non-visible pixels based on the generated depth visibility information. In such examples, the second processing unit 106 may be configured to cull the non-visible pixels before the visibility information 802 is generated.

In some examples, the second processing unit 106 may be configured to generate a plurality of depth visibility information for each of a plurality of bins. In some examples, the second processing unit 106 may be configured to generate the depth visibility information for each bin of the plurality of bin in parallel. While in some examples, the second processing unit 106 may be configured to generate the depth visibility information one at a time for each bin of the plurality of bins. In some examples, the second processing unit 106 may be configured to generate respective visibility information for each respective bin of the plurality of bins. In some examples, to render graphical content for the framebuffer using the plurality of bins, the second processing unit 106 may be configured to render the graphical content based on the respective visibility information for each respective bin of the plurality of bins In some examples, the second processing unit 106 may be configured to render a depth render pass of the application requested depth pre-pass. The second processing unit 106 may be configured to render the depth render pass based on the depth visibility information generated during the depth visibility pass of the application requested depth pre-pass. While in other examples, the second processing unit 106 may be configured to render the depth render pass based on the color visibility information generated during a color visibility pass of the application requested color pass.

Figure 10:
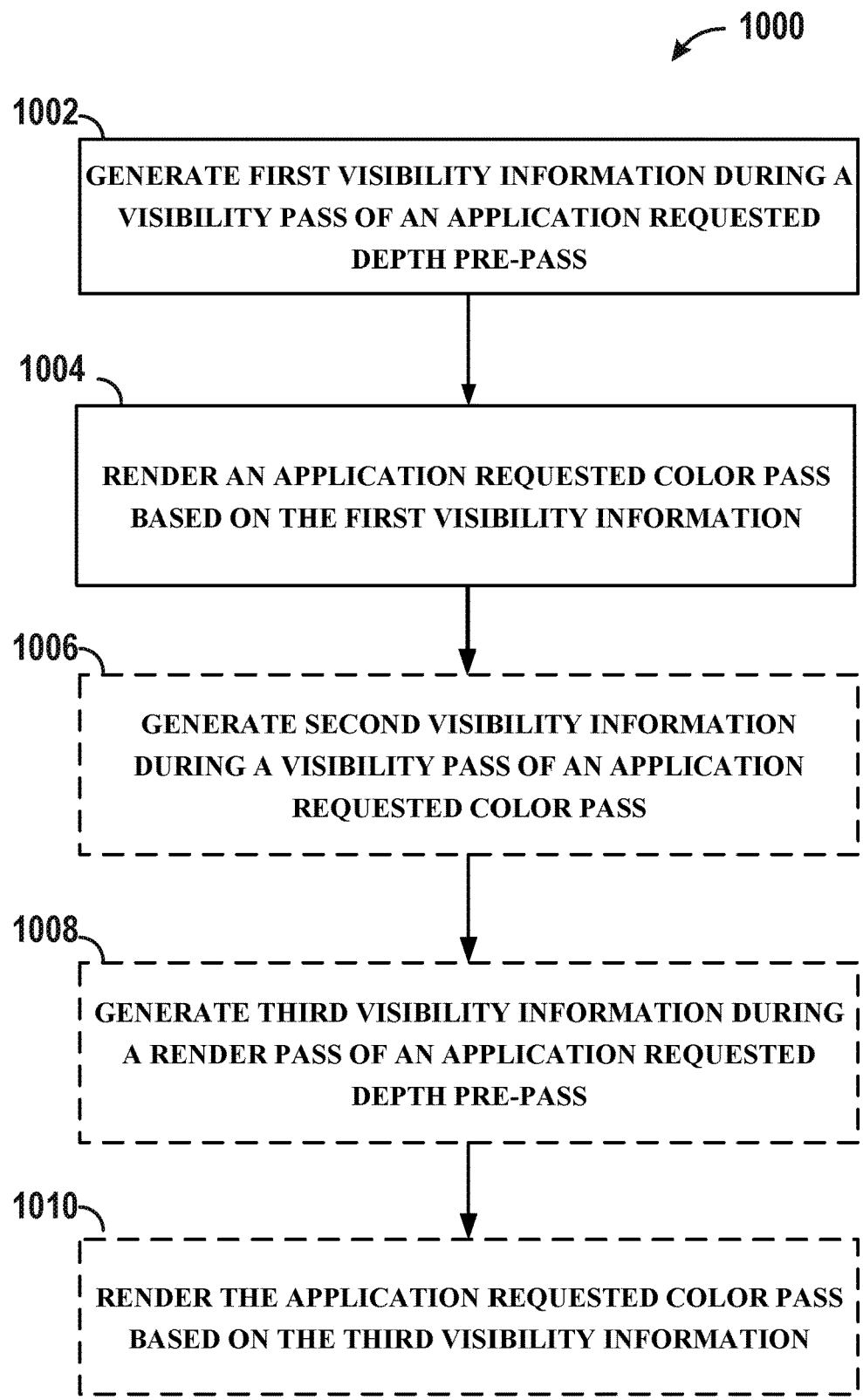
FIG. 10 illustrates an example flowchart of an example method in accordance with one or more techniques of this disclosure.

FIG. 10 illustrates an example flowchart 1000 of a method in accordance with one or more techniques of this disclosure. The method may be performed by the second processing unit 106 to generate graphical content as shown in FIG. 2A, 7, or 8. In some examples, the method illustrated in flowchart 1000 may include one or more functions described herein that are not illustrated in FIG. 10, and/or may exclude one or more illustrated functions. Optional aspects are illustrated with a dashed line.

At block 1002, the second processing unit may be configured to generate first visibility information during a visibility pass of an application requested depth pre-pass, as described in connection with the example in FIG. 7. For example, in architecture 700A of FIG. 7, the GPU 502 may be configured to generate the visibility stream 510 (e.g., first visibility information) during the depth visibility pass.

At block 1004, the second processing unit may be configured to render an application requested color pass based on the first visibility information, as described in connection with the example in FIG. 7. For example, in architecture 720B of FIG. 7, the GPU 502 may be configured to receive, as input, the visibility stream 510 (e.g., first visibility stream) to perform the visibility pass associated with the color pass.

At block 1006, the second processing unit may be configured to generate second visibility information during a visibility pass of an application requested color pass, as described in connection with the example in FIG. 7. Referring back to architecture 720B of FIG. 7, the GPU 502 receives the visibility stream 510, as input, and generates the visibility stream 514 (e.g., second visibility information) based on the visibility stream 510 (e.g., first visibility information). In such example, the visibility stream 514 is generated based on the visibility stream 510.

At block 1008, the second processing unit may be configured to generate third visibility information during a render pass of an application requested depth pre-pass, as described in connection with the example in FIG. 8. For example, in the architecture 800C of FIG. 8, the GPU 502 may receive input from visibility stream 602 to perform the render pass. In some examples, the visibility stream 514 (e.g., second visibility information) may be inputted into visibility stream 602, such that the visibility stream 514 may be utilized by the GPU 502 during the render pass associated with the application requested depth pre-pass. The GPU 502 of architecture 800C generates the new visibility stream 802 (e.g., third visibility information) during the render pass, and the new visibility stream 802 is generated based on the generated visibility stream 514 (e.g., second visibility information).

At block 1010, the second processing unit may be configured to render the application requested color pass based on the third visibility information, as described in connection with the example in FIG. 8. For example, in the architecture 820D of FIG. 8, the GPU 502 may be configured to receive, as input, the new visibility stream 802 (e.g., third visibility information) to render the color render pass. The color render pass is generated based on the new visibility stream 802.

In one configuration, the second processing unit 106 includes means for generating first visibility information during a visibility pass associated with an application requested depth pre-pass, means for rendering an application requested color pass based on the first visibility information generated during the visibility pass associated with the application requested depth pre-pass, means for generating second visibility information during a render pass associated with the application requested depth pre-pass, the second visibility information being generated based on the generated first visibility information, the application requested color pass being rendered based on the generated second visibility information, means for generating third visibility information during a visibility pass associated with the application requested color pass, wherein the third visibility information is generated based on the generated first visibility information, and the second visibility information is generated based on the generated third visibility information, means for generating third visibility information during a visibility pass associated with the application requested color pass, wherein the third visibility information is generated based on the generated second visibility information, and the application requested color pass is rendered based on the generated third visibility information, means for receiving an indication that first geometry corresponding to the visibility pass associated with the application requested depth pre-pass is identical to second geometry corresponding to the visibility pass associated with the application requested color pass, wherein the GPU determines to generate the third visibility information upon receiving the indication that the first geometry is identical to the second geometry, means for generating third visibility information during a render pass associated with the application requested depth pre-pass, the third visibility information being generated based on the generated second visibility information, means for rendering the application requested color pass during a render pass associated with the application requested color pass based on the generated third visibility information, means for identifying one or more non-visible pixels based on the generated first visibility information, and means for culling the non-visible pixels before rendering the application requested color pass.

In some aspects, the disclosure may include a computer-readable medium having code stored thereon that, when executed, causes a processing unit to generate first visibility information during a visibility pass associated with an application requested depth pre-pass, and render an application requested color pass based on the first visibility information generated during the visibility pass associated with the application requested depth pre-pass.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, it is understood that such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disc and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more DSPs, general purpose microprocessors, ASICs, ALUs, FPGAs, or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of operation of a graphics processing unit (GPU), comprising:
   generating first visibility information during a visibility pass associated with an application requested depth pre-pass; and
   generating second visibility information during a render pass associated with the application requested depth pre-pass, the second visibility information being generated based on the generated first visibility information;
   generating third visibility information during a visibility pass associated with an application requested color pass; and
   rendering the application requested color pass based on the first visibility information generated during the visibility pass associated with the application requested depth pre-pass, wherein the application requested color pass is rendered during a render pass associated with the application requested color pass, the application requested color pass being rendered based on the generated second visibility information.

2. The method of claim 1, wherein Late Z operations identified during the render pass associated with the application requested depth pre-pass are incorporated into the generated second visibility information.

3. The method of claim 2, wherein vertex processing is skipped in the render pass associated with the application requested color pass based on the Late Z operations incorporated in the generated second visibility information.

4. The method of claim 2, wherein depth surfaces are rendered when generating the second visibility information, and the application requested color pass is further rendered based on the rendered depth surfaces.

5. The method of claim 1, wherein the third visibility information is generated based on the generated first visibility information, and the second visibility information is generated based on the generated third visibility information.

6. The method of claim 5, further comprising receiving an indication that first geometry corresponding to the visibility pass associated with the application requested depth pre-pass is identical to second geometry corresponding to the visibility pass associated with the application requested color pass, wherein the GPU determines to generate the third visibility information upon receiving the indication that the first geometry is identical to the second geometry.

7. The method of claim 5, wherein the visibility pass associated with the application requested depth pre-pass and the visibility pass associated with the application requested color pass are performed sequentially in the same visibility pass, and the render pass associated with the application requested depth pre-pass and the render pass associated with the application requested color pass are performed sequentially in the same render pass.

8. The method of claim 1, wherein the third visibility information is generated based on the generated second visibility information, and the application requested color pass is rendered based on the generated third visibility information.

9. The method of claim 1, wherein the application requested color pass is rendered during a visibility pass associated with the application requested color pass, second visibility information is generated during the visibility pass associated with the application requested color pass, and the second visibility information is generated based on the first visibility information.

10. The method of claim 9, further comprising generating third visibility information during a render pass associated with the application requested depth pre-pass, the third visibility information being generated based on the generated second visibility information.

11. The method of claim 10, further comprising rendering the application requested color pass during a render pass associated with the application requested color pass based on the generated third visibility information.

12. The method of claim 1, wherein the first visibility information is generated in parallel for each bin of a plurality of bins.

13. The method of claim 1, further comprising:
   identifying one or more non-visible pixels based on the generated first visibility information; and
   culling the non-visible pixels before rendering the application requested color pass.

14. A graphics processing unit (GPU), comprising:
   a memory; and
   at least one processing unit coupled to the memory and configured to:
   generate first visibility information during a visibility pass associated with an application requested depth pre-pass;
   generate second visibility information during a render pass associated with the application requested depth pre-pass, the second visibility information being generated based on the generated first visibility information;
   generate third visibility information during a visibility pass associated with an application requested color pass; and
   render the application requested color pass based on the first visibility information generated during the visibility pass associated with the application requested depth pre-pass, wherein the application requested color pass is rendered during a render pass associated with the application requested color pass, the application requested color pass being rendered based on the generated second visibility information.

15. The GPU of claim 14, wherein the third visibility information is generated based on the generated first visibility information, and the second visibility information is generated based on the generated third visibility information.

16. The GPU of claim 15, wherein the at least one processing unit is further configured to receive an indication that first geometry corresponding to the visibility pass associated with the application requested depth pre-pass is identical to second geometry corresponding to the visibility pass associated with the application requested color pass, wherein the GPU determines to generate the third visibility information upon receiving the indication that the first geometry is identical to the second geometry.

17. The GPU of claim 14, wherein the third visibility information is generated based on the generated second visibility information, and the application requested color pass is rendered based on the generated third visibility information.

18. The GPU of claim 14, wherein the application requested color pass is rendered during a visibility pass associated with the application requested color pass, second visibility information is generated during the visibility pass associated with the application requested color pass, and the second visibility information is generated based on the first visibility information.

19. The GPU of claim 18, wherein the at least one processing unit is further configured to generate third visibility information during a render pass associated with the application requested depth pre-pass, the third visibility information being generated based on the generated second visibility information.

20. The GPU of claim 19, wherein the at least one processing unit is further configured to render the application requested color pass during a render pass associated with the application requested color pass based on the generated third visibility information.

21. A graphics processing unit (GPU) apparatus, comprising:
    means for generating first visibility information during a visibility pass associated with an application requested depth pre-pass;
    means for generating second visibility information during a render pass associated with the application requested depth pre-pass, the second visibility information being generated based on the generated first visibility information;
    means for generating third visibility information during a visibility pass associated with an application requested color pass; and
    means for rendering the application requested color pass based on the first visibility information generated during the visibility pass associated with the application requested depth pre-pass, wherein the application requested color pass is rendered during a render pass associated with the application requested color pass, the application requested color pass being rendered based on the generated second visibility information.

22. The GPU of claim 21, wherein the third visibility information is generated based on the generated first visibility information, and the second visibility information is generated based on the generated third visibility information.

23. The GPU of claim 21, wherein the third visibility information is generated based on the generated second visibility information, and the application requested color pass is rendered based on the generated third visibility information.

24. A non-transitory computer-readable medium having code stored thereon that, when executed, causes a processing unit to:
    generate first visibility information during a visibility pass associated with an application requested depth pre-pass;
    generate second visibility information during a render pass associated with the application requested depth pre-pass, the second visibility information being generated based on the generated first visibility information;
    generate third visibility information during a visibility pass associated with an application requested color pass; and
    render the application requested color pass based on the first visibility information generated during the visibility pass associated with the application requested depth pre-pass, wherein the application requested color pass is rendered during a render pass associated with the application requested color pass, the application requested color pass being rendered based on the generated second visibility information.

* * * * *